(12) United States Patent
Korbis et al.

(10) Patent No.: US 12,581,302 B2
(45) Date of Patent: Mar. 17, 2026

(54) CONTRABAND DETECTION SYSTEM

(71) Applicant: MDESS, LLC, Beavercreek, OH (US)

(72) Inventors: Je'an Nicholas Korbis, Adelaide (AU); Jeremy Bailey, Martinez, GA (US)

(73) Assignee: MDESS, LLC, Beavercreek, OH (US)

( * ) Notice: Subject to any disclaimer, the term of this patent is extended or adjusted under 35 U.S.C. 154(b) by 307 days.

(21) Appl. No.: 18/496,430

(22) Filed: Oct. 27, 2023

(65) Prior Publication Data

US 2025/0142333 A1    May 1, 2025

(51) Int. Cl.
*H04W 12/08* (2021.01)
*H04W 12/72* (2021.01)

(52) U.S. Cl.
CPC ........... *H04W 12/08* (2013.01); *H04W 12/72* (2021.01)

(58) Field of Classification Search
CPC ..... H04W 12/086; H04W 12/06; H04W 8/22; H04W 8/183
USPC ........................................................ 370/329
See application file for complete search history.

(56) References Cited

U.S. PATENT DOCUMENTS

| | | | | |
|---|---|---|---|---|
| 7,433,273 B2 * | 10/2008 | Oguchi | .................. | G04C 3/008 |
| | | | | 368/46 |
| 9,653,785 B2 * | 5/2017 | Vance | .................... | H01Q 1/273 |
| 10,839,626 B2 * | 11/2020 | Spatig | ....................... | G07C 9/20 |
| 11,367,323 B1 * | 6/2022 | Shahidzadeh | .......... | G07C 9/215 |
| 11,397,953 B2 * | 7/2022 | Martin | ................. | G06Q 30/016 |
| 11,711,691 B2 * | 7/2023 | Gundavelli | ........... | H04L 63/104 |
| | | | | 370/329 |

(Continued)

FOREIGN PATENT DOCUMENTS

| | | | | |
|---|---|---|---|---|
| CN | 101753227 | A | * | 6/2010 |
| CN | 102026217 | A | * | 4/2011 |

(Continued)

OTHER PUBLICATIONS

"IEEE Standard Cybersecurity Requirements for Substation Automation, Protection, and Control Systems," in IEEE Std C37.240-2014 , vol. No., pp. 1-38, Jan. 30, 2015, doi: 10.1109/IEEESTD.2015.7024885 (Year: 2015).*

*Primary Examiner* — William D Cumming
(74) *Attorney, Agent, or Firm* — ARENTFOX SCHIFF LLP

(57) ABSTRACT

The system manages communication of cellular devices within a secured facility using a shielded box that blocks external RF signals. Inside the box, internal antennas broadcast cellular network signals that mimic a carrier's base station, prompting any placed device to connect. When a device attempts access, the system collects its identifying information and compares it with an authorized-device database stored locally or in the cloud. If the information matches, the device is logged as authorized. A facility network controller then regulates all incoming and outgoing wireless transmissions. When it detects identifying data from a logged authorized device, it permits and manages the transmission to its intended destination. The system offers secure, low-cost, and reliable identification and management of cellular devices in secured facilities by isolating devices, extracting immutable identifiers, registering authorized devices, and enabling carrier-level blocking of unauthorized or contraband transmissions without continuous on-site monitoring or network "bleed" issues.

20 Claims, 11 Drawing Sheets

(56) References Cited

U.S. PATENT DOCUMENTS

| | | | | |
|---|---|---|---|---|
| 2004/0233789 A1 * | 11/2004 | Oguchi | ................. | G04G 21/04 |
| | | | | 368/47 |
| 2016/0218419 A1 * | 7/2016 | Vance | .................... | H01Q 1/241 |
| 2022/0182826 A1 * | 6/2022 | Gundavelli | ......... | H04W 12/086 |
| 2025/0119744 A1 * | 4/2025 | Korbis | ................... | H04W 8/22 |
| 2025/0133390 A1 * | 4/2025 | Korbis | ................. | H04W 8/183 |
| 2025/0142333 A1 * | 5/2025 | Korbis | ................. | H04W 12/06 |

FOREIGN PATENT DOCUMENTS

| | | | | | |
|---|---|---|---|---|---|
| CN | 110493232 | B | * | 3/2022 | ............ H04W 12/63 |
| EP | 4024926 | A1 | * | 7/2022 | ............ H04W 12/06 |
| WO | WO-2016116970 | A1 | * | 7/2016 | ............. H01Q 1/273 |

* cited by examiner

367
Example cell – GSMA 314 causing gateway 306 to block contraband telecommunication device 304.3 call/text/data attempt from correctional facility 319 to device 304.1

101

800

| Cell 801 | | eNodeB 803 |
|---|---|---|

RRC Connection Request 812 →

← RRC Connection Setup 814

RRC Connection Setup Complete 816 →

← MM Location Update Request (Requesting IMSI) 818

MM Identity Response (IMSI) 820 →

← MM Identity Update Request (Requesting IMEI) 822

MM Identity Response (IMEI) 824 →

← MM Identity Request (Requesting IMEISV) 826

MM Identity Response (IMEISV) 828 →

← MM Identity Request (Requesting TMSI) 830

MM Identity Response (TMSI) 832 →

FIG. 8

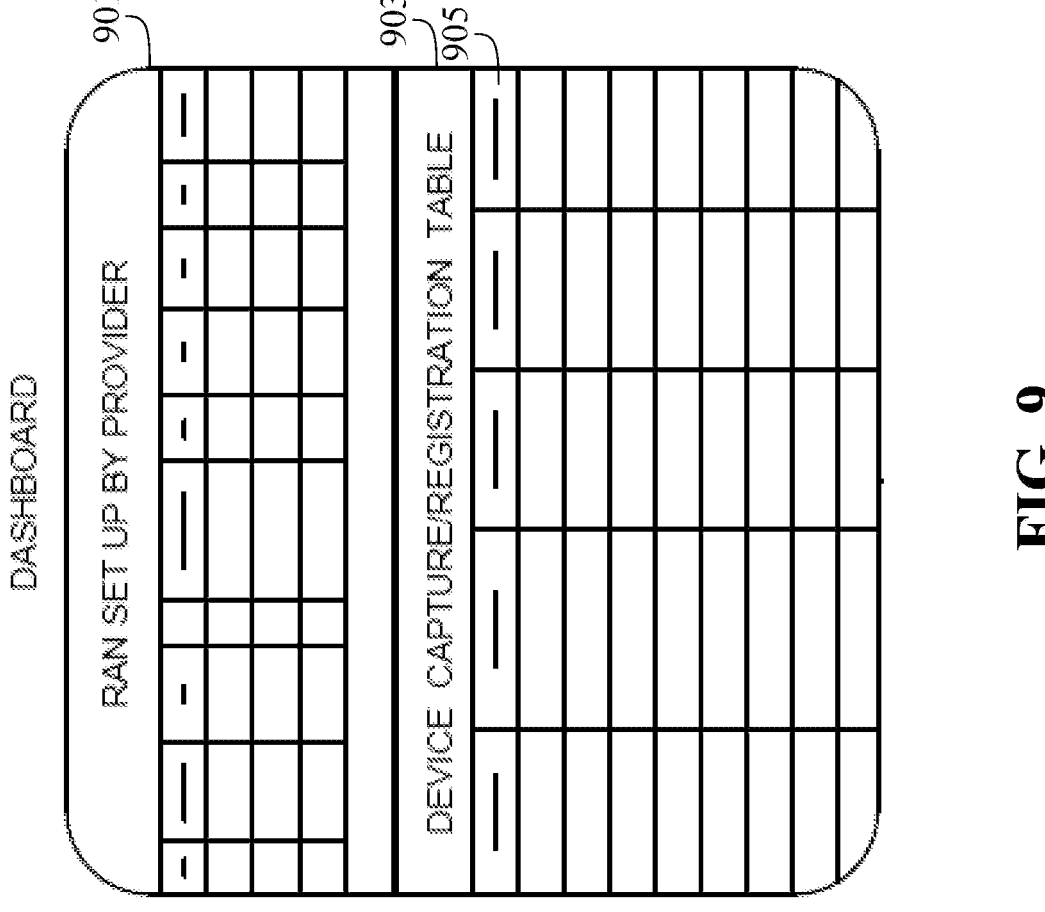
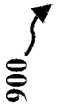
FIG. 9

1000

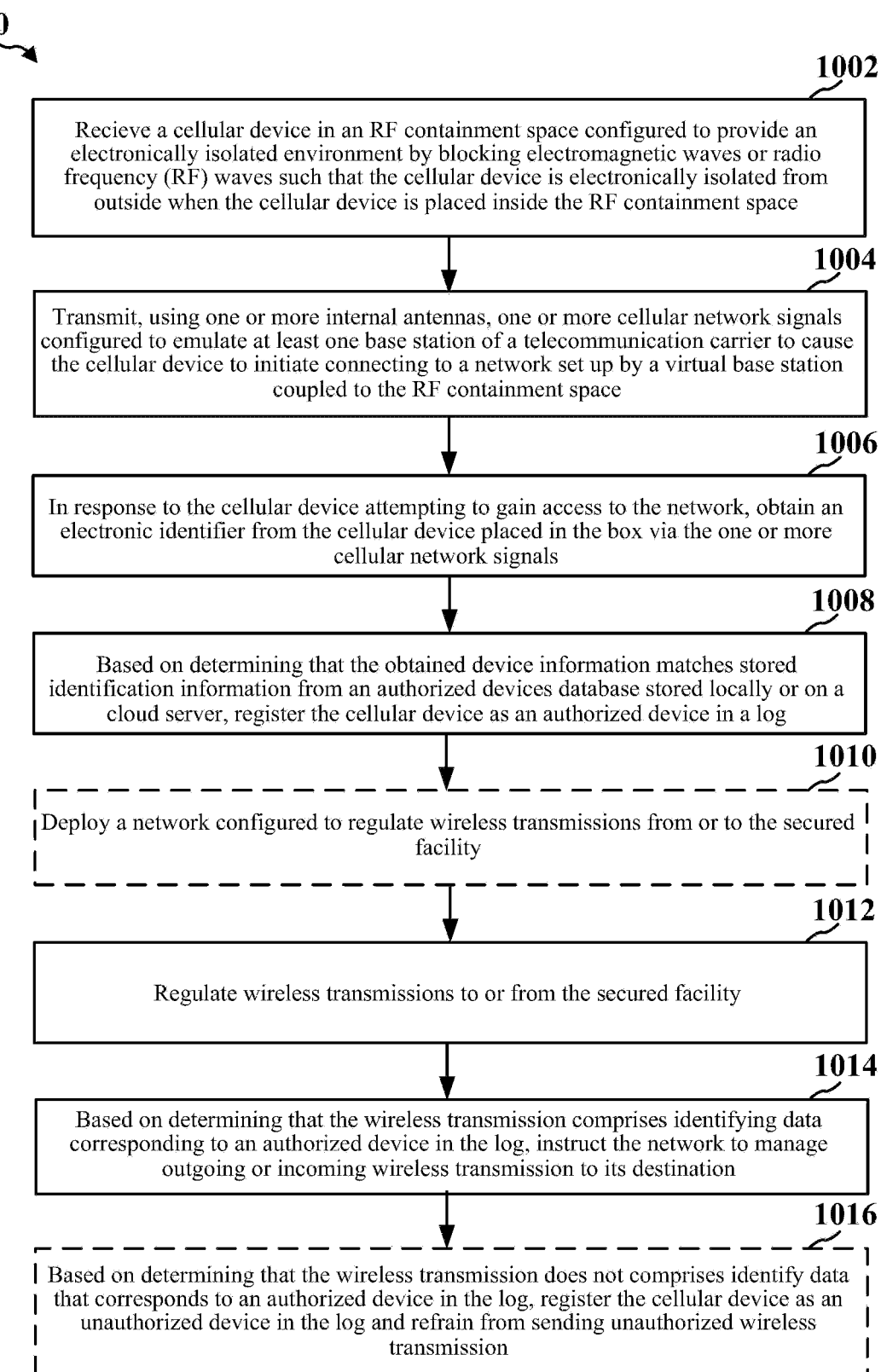

1002

Recieve a cellular device in an RF containment space configured to provide an electronically isolated environment by blocking electromagnetic waves or radio frequency (RF) waves such that the cellular device is electronically isolated from outside when the cellular device is placed inside the RF containment space

1004

Transmit, using one or more internal antennas, one or more cellular network signals configured to emulate at least one base station of a telecommunication carrier to cause the cellular device to initiate connecting to a network set up by a virtual base station coupled to the RF containment space

1006

In response to the cellular device attempting to gain access to the network, obtain an electronic identifier from the cellular device placed in the box via the one or more cellular network signals

1008

Based on determining that the obtained device information matches stored identification information from an authorized devices database stored locally or on a cloud server, register the cellular device as an authorized device in a log

1010

Deploy a network configured to regulate wireless transmissions from or to the secured facility

1012

Regulate wireless transmissions to or from the secured facility

1014

Based on determining that the wireless transmission comprises identifying data corresponding to an authorized device in the log, instruct the network to manage outgoing or incoming wireless transmission to its destination

1016

Based on determining that the wireless transmission does not comprises identify data that corresponds to an authorized device in the log, register the cellular device as an unauthorized device in the log and refrain from sending unauthorized wireless transmission

Reception Component 1130

Network Emulator Component 1142

Radio Scan Component 1140

Registration Component 1146

Identification Component 1144

Tracking Component 1150

GUI Component 1148

Regulation Component 1154

Alert Component 1152

Communication Manager 1132

Transmission Component 1134

Baseband Unit 1104

CONTRABAND DETECTION SYSTEM

BACKGROUND

Technical Field

The present disclosure generally relates to communication systems, and more particularly, to identification and management of telecommunication devices within a secured facility.

Introduction

The use of contraband wireless devices, including cellular devices, tablets, etc., by users at a secured facility remains an ongoing problem. Sometimes these calls, texts or social media transmissions, etc., are innocuous policy violations at the facility. In other cases, the use of contraband wireless devices may constitute state or federal crimes. A significant number of calls and texts based on contraband devices, however, are more sinister. For example, in the context of correctional facilities, contraband wireless devices have been used by inmates to order the deaths of individuals, facilitate smuggling of controlled substances and weapons into the facility, set up means for escape attempts, initiate organized gang violence, etc.

In addition, wireless devices may also be used inside a secured facility for espionage purposes such as recording or capturing confidential information inside the secured facility. For example, an IT employee may go into a secured facility and use their wireless device to steal confidential information or trade secrets. Accordingly, it is important to properly identify and manage wireless devices that are entering and leaving a secured facility.

Conventional attempts to address contraband devices include a secured facility include contracting a specialized firm to take up long-term or permanent residence at the secured facility. The contractor may include its own facility-specific telecommunications network and base station to regulate all voice and data transmissions to and from the facility. Ideally, the antennas and network components are positioned such that all communications, authorized or otherwise, are routed through this internal network to confirm they are legitimate. The internal network may block transmissions from suspicious or confirmed contraband devices, and may gather information from the transmissions for investigative purposes.

One problem with this implementation is the potentially exorbitant cost to the facility of running the internal network on a 24/7 basis. Another problem is the network itself. The antennas' transmissions can "bleed" out of the facility, inadvertently blocking legitimate transmissions from citizens that happen to be driving by the facility, for example. The opposite problem may occur where the antenna power is reduced to avoid bleeding but where the reduction is sufficient to enable contraband devices to access external base stations, and hence bypass the very protections put in place to prevent this activity.

It is therefore important to develop new techniques that identify and manage use of cellular devices in a secured area an easy and reliable manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Conventional solutions to identifying and tracking contraband wireless devices include retaining a contractor firm to situate itself at the facility and set up a "managed access system" (MAS) including an intermediary wireless network having base stations, monitoring equipment, etc. The MAS is a system that deploys a secure cellular umbrella over a specified area within the bounds of a secured facility to either permit or to interface with transmissions of cellular devices within the facility. For purposes of this disclosure, a MAS can include either a mobile or a fixed network, or a combination of both, including any cellular network for gathering relevant data. The base station's antennas are directed and powered to cover the facility grounds. Inmates may often attempt to possess and use contraband wireless devices including cellular telephones, disposable phones, and even tablets and personal computers (PCs) over the wireless network for voice calls, texts, instant messages, VOIP transmissions, and the like. Ideally, the MAS authorizes legitimate calls from pre-authorized phones, etc. and intercepts unauthorized transmissions. The MAS may include a central facility on the premises using servers to gather and process information about the unauthorized transmissions, to add devices to the contraband list, and to facilitate investigative efforts of the facility staff into related illegal activities.

This present solution can be prohibitively expensive. For one, the facility must be monitored on a 24/7 basis. The maintenance of the equipment and contracted staff likely burdens the allotted budgets of these facilities. Technical challenges also must be addressed. Examples include where the antennas from the base station at the facility inadvertently "bleed" to regions outside the facility to prevent legitimate calls from being intercepted or cut off. Similarly, the facility may include spotty regions where inmates can access external base stations using contraband devices. The problems are exacerbated in an urban environment, where the potential number of networks and individuals near the facility increase.

Aspects of the present disclosure overcome the above-stated problems and other shortcomings with this approach.

In an aspect of the disclosure, a system, apparatus, and method are provided. The system for managing cellular devices in a secured facility is provided. The system for managing cellular devices may include a box configured to provide an electronically isolated environment by blocking electromagnetic waves or radio frequency (RF) waves such that a cellular device is electronically isolated from outside the box when placed in the box, where the box may comprise one or more internal antennas. The system may also include a memory for storing a log. The system may further include one or more processors configured to: transmit, using the one or more internal antennas, one or more cellular network signals configured to emulate at least one base station of a telecommunication carrier to cause the cellular device to attempt to connect to a network set up by a base station when the cellular device is placed in the box, in response to the cellular device attempting to gain access to the network, obtain device information from the cellular device placed in the box via the one or more cellular network signal, based on determining that the obtained device information matches stored identification information from an authorized devices database stored locally or on a cloud server, register the cellular device as an authorized device in the log. The system may further include a network configured to manage outgoing or incoming wireless transmission, wherein the network comprises a controller configured to: regulate wireless transmissions to or from the secured facility, based on determining that the wireless transmission comprises identifying data corresponding to an authorized device in the log, instruct the network to manage the outgoing or incoming wireless transmission to its destination.

In another aspect of the disclosure, an apparatus is provided. The apparatus for managing cellular devices in a secured facility is provided. The apparatus for managing cellular devices may include a box configured to provide an electronically isolated environment by blocking electromagnetic waves or radio frequency (RF) waves such that a cellular device is electronically isolated from outside the box when placed in the box, where the box may comprise one or more internal antennas. The apparatus may also include a memory for storing a log. The apparatus may further include one or more processors configured to: transmit, using the one or more internal antennas, one or more cellular network signals configured to emulate at least one base station of a telecommunication carrier to cause the cellular device to attempt to connect to a network set up by a base station when the cellular device is placed in the box, in response to the cellular device attempting to gain access to the network, obtain device information from the cellular device placed in the box via the one or more cellular network signal, based on determining that the obtained device information matches stored identification information from an authorized devices database stored locally or on a cloud server, register the cellular device as an authorized device in the log. The apparatus may further include a network configured to manage outgoing or incoming wireless transmission, wherein the network comprises a controller configured to: regulate wireless transmissions to or from the secured facility, based on determining that the wireless transmission comprises identifying data corresponding to an authorized device in the log, instruct the network to manage the outgoing or incoming wireless transmission to its destination.

In another aspect of the disclosure, a method is provided. The method for managing cellular devices in a secured facility may include receiving a cellular device in a box configured to provide an electronically isolated environment by blocking electromagnetic waves or radio frequency (RF) waves such that a cellular device placed in the box is electronically isolated from an exterior environment, wherein the box comprises one or more internal antennas. The method may also include transmitting, using the one or more internal antennas, one or more cellular network signals configured to emulate at least one base station of a telecommunication carrier to cause the cellular device to attempt to connect to a network set up by a base station when the cellular device is placed in the box. The method may also include, in response to the cellular device attempting to gain access to the network, obtaining device information from the cellular device placed in the box via the one or more cellular network signal. The method may also include, based on determining that the obtained device information matches stored identification information from an authorized devices database stored locally or on a cloud server, registering the cellular device as an authorized device in a log. The method may also include deploying a network configured to regulate wireless transmissions from or to the secured facility. The method further includes regulating wireless transmissions to or from the secured facility. The method further includes, based on determining that the wireless transmission comprises identifying data corresponding to an authorized device in the log, instructing the network to manage outgoing or incoming wireless transmission to its destination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a call flow diagram of an example identification process between an identification system and a wireless device according to an embodiment.

FIG. 9 is an example of a dashboard UI according to some embodiments.

FIG. 10 is flowchart example of an example method of managing communication of cellular devices using an identification system in a secured facility according to an embodiment.

DETAILED DESCRIPTION

Figure 1:
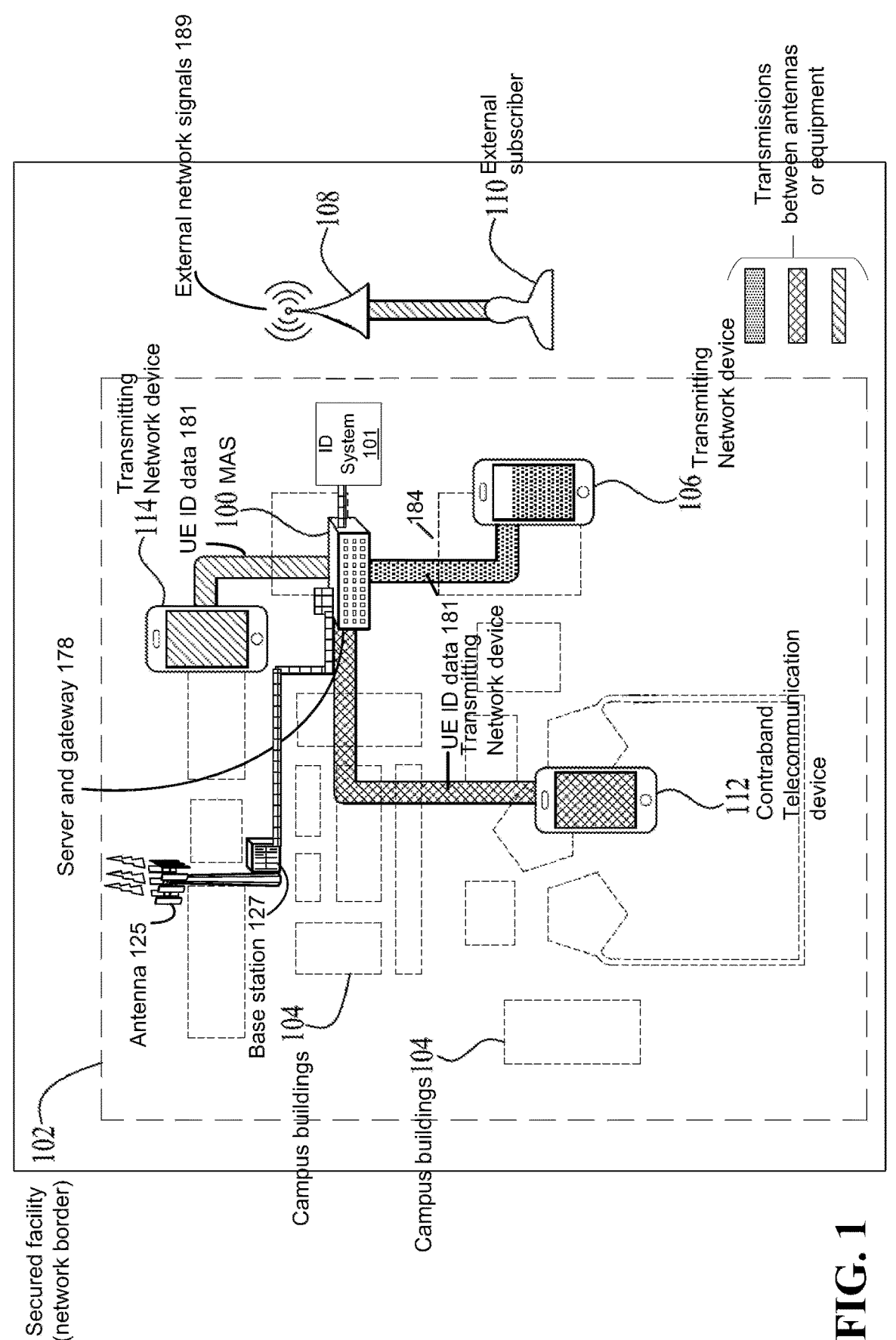
FIG. 1 is a diagram illustrating an example of a Managed Access System (MAS) and an identification system that may be used at a secured facility.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), Software defined Radio (SDR), Power Amplifiers (PA), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

As used herein, the terms "cellular device." "telecommunication carrier devices," "wireless devices", "user equipment" (UE), and "base station" are not intended to be specific or otherwise limited to any particular Radio Access Technology (RAT), unless otherwise noted. In general, a cellular device, telecommunication carrier device, wireless device, or UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle, Internet of Things (IoT) device, etc.) used by a user to communicate over a wireless communication network. A UE may be mobile or may (e.g., at certain times) be stationary, and may communicate with a Radio Access Network (RAN). As used herein, the terms "cellular device," "mobile device", "telecommunication carrier device." "wireless terminal", or "UE" may be referred to interchangeably as an "access terminal" or "AT", a "client device", a "wireless device," a "subscriber device," a "subscriber terminal", a "subscriber station," a "user terminal," a "mobile terminal," a "mobile station", or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may alternatively referred to as an access point (AP), a network node, a NodeB, an evolved NodeB (eNB), a New Radio (NR) Node B (also referred to as gNB or gNodeB), etc. In addition, in some systems, a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.).

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

The mobile assessment may be established by a contracting entity, firm, corporation, individual, partnership, or group thereof. For simplicity, the establishing entity is sometimes referenced as a contractor. The term contractor is broadly intended to include, without limitation, any of the aforementioned entities or other individuals regardless of their legal status. In addition, the term "correctional facility", for purposes of this disclosure, is intended to include any facility in which individuals are incarcerated for any reason. Examples of correctional facilities include, without limitation, prisons, city, state and country jails, psychiatric hospitals, and detention centers of any kind. The term inmate as used in this disclosure is intended to include any incarcerated individual, whether or not convicted of a crime, and whether or not a patient in a hospital, and is not limited to any particular citizenship. The terms inmate and incarcerated individual may also be referred to sometimes herein as an "incarcerate." As these terms potentially include psychiatric patients or individuals at detention centers, these terms are not necessarily intended to harbor a derogatory connotation. This includes incarcerates or inmates convicted of a crime.

A "secured facility" or "correctional facility" can also include government or commercial secure sites, military bases, and military incarceration facilities, and any similar temporary or permanent secure site, whether civilian or non-civilian.

Conventional solutions to contraband include retaining a contractor firm to situate itself at the facility and set up a long-term "managed access system" (MAS) including an intermediary wireless network having one or more base stations, monitoring equipment, etc. For purposes of this disclosure, a MAS need not be in any fixed location. A MAS can include either a mobile or a fixed network, or a combination of both, including any cellular network for gathering relevant data. The base station's antennas are directed and powered to cover the secured facility grounds. Inmates or patients may attempt to use contraband wireless devices including cellular telephones, disposable phones, and even tablets and personal computers (PCs) over the wireless network for voice calls, texts, instant messages, VOIP transmissions, and the like. Ideally, the MAS authorizes legitimate calls from pre-authorized or registered cellular devices stored in a log and blocks unauthorized transmissions from unidentified cellular devices or known contraband cellular devices. The MAS may include a central facility on the premises using servers to gather and process information about the authorized and unauthorized transmissions, to add devices to the allowed list, to add devices to the contraband list, and to facilitate investigative efforts of the secured facility staff into related illegal activities.

This present solution can be prohibitively expensive. For one, the secured facility must be monitored on a 24/7 basis. The maintenance of the equipment and contracted staff likely burdens the allotted budgets of these facilities. Technical challenges also must be addressed. Examples include where the antennas from the base station at the facility inadvertently "bleed" to regions outside the facility. Otherwise legitimate calls may be intercepted or cut off. Similarly, the facility may include spotty regions where inmates can access external base stations using contraband devices. The problems are exacerbated in an urban environment, where the potential number of networks and individuals near the facility increase.

Various aspects of the present disclosure describe carrier-based management of cellular devices by allowing authorized voice or data-based transmissions to connect to telecommunication carrier networks and blocking unauthorized voice or data-based transmissions to or from unidentified cellular devices or contraband devices at a secured facility. That is, using an identification system to identify and log authorized devices and a MAS to manage communication of the identified authorized devices, the blocking is performed by the carrier by managing network access of identified cellular devices based on contents of a standardized database, and is not limited to any one carrier.

A base station and related server system is established as part of a MAS. One significant disadvantage with this approach is the potentially exorbitant expense to the facility to have a permanent firm performing this cellular contraband regulation 24 hours a day, seven days a week for a possibly indefinite period. Additional shortcomings relate to the problems that occur when the network inadvertently "bleeds" into the surrounding area, resulting in civilians' cellular equipment being affected by the prison network. If the contracting firm attempts to fix this problem (particularly in an urban environment involving other base stations in the proximity of the facility) by reducing the transmission and receive power of the on-site base station(s), then it may become possible for inmates to reach external base stations using contraband phones. The inmates may then altogether bypass the restrictions in place.

According to one aspect of the disclosure, the unidentified or contraband equipment is blocked on a carrier level, rather than directly at the secured facility. In the aspect disclosed herein, a network configuration may be set up at the secured facility. This configuration may include, for example, one or more base stations, one or more transceivers, a server with a processor, and a gateway for selectively allowing data from the secured facility to pass to a remote network, e.g., a network outside of the secured facility. Other monitoring equipment may be used as necessary, such as spectrum analyzers, repeaters, etc.

In addition, the term "correctional facility." for purposes of this disclosure, is intended to include any facility in which individuals are incarcerated for any reason. Examples of correctional facilities include, without limitation, prisons, city, state and country jails, psychiatric hospitals, and detention centers of any kind. The term inmate as used in this disclosure is intended to include any incarcerated individual, whether or not convicted of a crime, and whether or not a patient in a hospital, and is not limited to any particular citizenship. The terms inmate and incarcerated individual may also be referred to sometimes herein as an "incarcerate." As these terms potentially include psychiatric patients or individuals at detention centers, these terms are not necessarily intended to harbor a derogatory connotation. This includes incarcerates or inmates convicted of a crime.

A "correctional facility" can also include government or commercial secure sites, military bases, and military incarceration facilities, and any similar temporary or permanent secure site, whether civilian or non-civilian.

Using an identification system, the contractor may collect transmitted data from the devices around the prison. For example, the facility or an affiliate (e.g., DOC) may provide the MAS system with one or more lists of authorized wireless devices (or registered wireless devices) identified from electronic identifiers by the identification system. For example, the authorized devices may include wireless devices employed by a prison or hospital staff, or visitors, for example.

Concurrent with the collection of data and storage into memory by a controller, processor or processing system (e.g., FIG. 2), the contractor may use a deployed network including the controller, specialized or custom hardware or software, and a network having one or more base stations to intercept wireless transmissions, and block transmissions having unknown identification information (e.g., or not registered) or having identification data that corresponds with a wireless device already known to be unauthorized.

The contractor may also employ equipment during the stay at the facility to ensure that any network bleeding is minimized, e.g., by using spectrum analyzers around the perimeter of the secured facility to determine network activity, or absence thereof. The controller may be used to fine tune the network by varying transmission power from different base stations, and varying other parameters.

In addition to the above capabilities, the data retrieval system or MAS disclosed herein may also monitor wireless devices using various techniques. This monitoring may include not only monitoring the data or voice content of the transmission, but also monitoring two-way communications to the extent permitted by the local, state, or national statutes and regulations. This monitored data can be used for investigative purposes to prevent conflicts learned about, to effect illicit drug seizures, and the like. This data, including the identifying information corresponding to the wireless devices being monitored, can also be stored in memory for use in carrier-based blocking of wireless transmissions. The data can be provided to third parties as described herein for carrier-level blocking. The data may be provided regarding unauthorized devices as soon as it is obtained, or once the contractor has exited the premises and removed its network equipment.

In other deployments, the contractor may be commissioned to gather whatever data it can as to unauthorized wireless transmissions, collect it in memory, and transmit the data to servers for use by facility investigators. This data can include the identifying information, the content of the call, text or other data transmission, the time(s) the calls were made or attempted, the geographical origin or location of the call, and other factors or patterns that may be relevant for investigative purposes, In some embodiments, the contractor may be commissioned to perform the investigation. In other embodiments, the data is passed off to other personnel for detailed review.

In some examples, the contractor may have a facility housing its own server with a processing system for evaluating the collected data, and a memory for storing the data. The historical data collected based on transmissions from both contraband and legitimate phones and other network devices may be stored in the memory at the offsite facility. In addition, as described below, various sources of third party data may be provided to users of the processing system and used in connection with making determinations whether devices are contraband.

The memory may, for example, be a data repository including one or more non-volatile memory devices. The contractor's location may include a server. The server may include the processing system and the memory. The terms that connote memory may often be used synonymously depending on the context, even if different types of memory at different locations are used. The processing system may include a user interface to enable one or more users (e.g., data analysts, investigators, etc.) to retrieve data from the connected memory, and to study the historical data and manipulate it as necessary. Based on a number of different criteria, such as the list of approved network devices (e.g., used by guards and prison personnel) provided by the identification system and in some embodiments, the lists of inmate-specific authorized individuals (that is, the list of people that a given inmate is allowed to call over an authorized phone at the facility), and other criteria described herein, the processing system may determine whether that the device is contraband.

Devices that have not been identified as registered by the identification system based on available data in memory may be deemed by the identification system 101 (and by users via the UIs) to constitute contraband devices. The identification system 101 (or a user via the UI) may generate a list of these devices or log these devices, and may perform various undertakings described herein that authorize, validate, and/or register the devices. One such undertaking is the necessary transfer of ownership of the contraband devices to the contracting entity. The transfer of ownership authorizes the contractor to request the carriers to ban the phone. The devices are validated, and a list of the validated unauthorized devices may be provided to the GSMA's database of lost, stolen, or in some embodiments, contraband phones. In some arrangements, the GSMA may delegate or contract out the responsibility for these databases or for other actions to another party. Thus, for purposes of this disclosure, the actions of managing the databases and acting as an intermediary between the carrier and the contractor may be performed by another entity without departing from the scope of the present disclosure.

The information in the database may be used by the carrier as an indicator to a specific gateway to manage user access by allowing authorized devices to a remote network or blocking an unauthorized device to a remote network, when an attempt is made to use a contraband device. A "remote network" for purposes of this disclosure is any network (e.g., a voice or data network) typically other than the MAS network at the secured facility, in which a device is attempting to access to communicate from within the secured facility to outside the secured facility.

FIG. 1 is a diagram illustrating an example of a wireless communication system, a managed access system (MAS) 100 that may be set up at a secured facility, and an identification system. The secured facility may be divided by the contractor into a secured facility network border which encompasses the grounds of the facility and which is also used for establishing the size and geometrical area of the network to be used by the MAS and/or identification system for data collection and possible data flow restriction activities. The purpose of the network setup is to gather information about devices that are transmitting at the secured facility to remote networks outside the secured facility (and vice versa). An example remote network may include a cell external to a border of the secured facility and served by base station 108, which can be then accessed by an external subscriber 110 using an authorized telecommunication device for the carrier that runs base station 108 and the corresponding cell. The remote network including the base station 108 is not affected by the MAS at the secured facility, since signals from contraband devices can be intercepted by base station 127 and remain internal to the secured facility. The external network 108 is identified merely to demonstrate that a carrier network may often be near the secured facility. The base station 127 may also forward wireless transmissions from authorized wireless devices to an external or remote network such as network 108 to facilitate authorized communications.

While the MAS 100 of FIG. 1 shows one base station 127, in other embodiments a plurality of base stations may be used to ensure that the coverage area of the facility fully accounted for. In addition, the network may be a multi-cell network, with a compact and thus a rapidly deployable processing systems and antenna configured to establish one cell of a plurality of cells within the secured facility.

The configuration of the MAS 100 may include a wireless communications system. The MAS 100 may include a base station 127 having an antenna array 125 that is directed or steered and powered as precisely as possible such that the geographical coverage includes an energy and bandwidth that falls within the range of the secured facility's grounds (defined generally by the network border 102). In some implementations, more than one base station may be used. The base station may be coupled via a backhaul connection 184 to additional network equipment, including server and gateway 178. The server and gateway 178 may be included, for example, within a temporary room implemented in one of the campus buildings 104 on the facility. That said, the MAS 100 as described in this disclosure is a tactical system and as such, it can be deployed nearly anywhere, including for example a tower, roof, fence line or from the contractor's roaming trailers. The server and gateway 178, along with workstations, related network equipment and temporary storage, for example, may be used to receive and process all the data involving data transmissions ideally from all devices within the network border 102 of secured facility.

In the arrangement of FIG. 1, the server and gateway, 178, base station 127 including the antenna array 125, and all the other network equipment may be implemented by the contractor. The server and gateway 178 may also include other network components, as necessary to enable the server to properly process devices over one or more network protocols (e.g., LTE, 5G, etc.) and to process this information for temporary storage, or for subsequent storage into a memory at the contractor's facility (e.g., FIGS. 3, 4) as described further below. The server and gateway 178 may be equipment belonging to the contractor, which ideally can be brought into the secured facility on a temporary basis and set up for use at the secured facility.

In this embodiment, the contractor may configure the base station 127, server and gateway 178, not merely to identify raw transmission data, but also to selectively allow or block transmissions going in and out of the secured facility. To allow authorized calls, the server and gateway 178 may connect to a base station 108 over a secure line external to the secured facility, e.g., to or from an external subscriber's 110 telecommunication device. If the device is on the "list" provided by the identification system 101 and the device is authorized, the MAS 100 can allow the call/text/data to proceed without interruption, either via the gateway 178, or by redirecting the transmission to a third party operator for completing the call/text/data to its intended destination. However, if the call identifies the subscriber device as not being included on a identification system provided list or file of authorized subscribers, for example, the server 178 may provide an indication to the gateway at the secured facility to intercept the communication, as before.

The MAS 100 may include a server and gateway 178 may which, as noted, be situated in an available room within the facility or on the perimeter for gathering data. The gathered data may be stored in an interim computer-readable medium, for subsequent transmission to an off-site memory repository. In some embodiments, the gathered data deemed relevant to the selective transmission process may be sent directly to an off-site memory (not shown) via a secure network connection. In the embodiment shown, the MAS 100 includes a base station backhaul link 184 for transmitting data received at the base station to the server and gateway 178. The base station 127 is coupled at one end to the antenna array 125, and at another end to the gateway 178 via backhaul 184. If the server in this case recognizes an authorized device transmitting data, the server may permit the gateway 178 to route the internal data to the base station 127, which transmits the data from the secured facility to an external network. Thus, the server may allow the gateway to pass authorized devices, while proscribing the gateway from transmitting data from contraband devices.

According to one aspect of the disclosure, an identification system 101 may be connected to a MAS 100 in order to collect data, identify, and register authorized devices. More detail about the identification system 101 will be described in detail in FIG. 6.

In some examples, the apparatus may contain a base station or deploy a virtual base station to emulate a base station of a telecommunication carrier to extract electronic identifiers from a cellular device. In the aspects disclosed herein, the apparatus may include a RF containment space (e.g., shielded box) for receiving a cellular device such that the cellular device is electronically isolated from an outside environment when placed inside the RF containment space. Once the cellular device is electronically isolated from the environment, the apparatus interrogates the cellular device for its electronic identifiers by causing the cellular device to connect to a network set up by the base station or virtual base station. This causes the cellular device to attempt to connect to the network and, in the process, transmit its electronic identifiers to the apparatus. In addition, the apparatus may also log the cellular device in the box as a known device and log electronic identifiers from the cellular device in a database of known devices (e.g., registered devices). This way when telecommunication within the secured facility is intercepted by the MAS 100, then the MAS system may identify the telecommunication by its electronic identifiers and allow the telecommunication to be passed to an external network. Similarly, when the telecommunication within the secured facility is intercepted by the MAS 100, the MAS 100 may identify the telecommunication as originating from a cellular device that has not been logged, authorized, or has been previously identified as contraband and block the telecommunications.

The data collected by the MAS 100 includes data originating from the signaling layer. This signal layer information includes identifying information of the telecommunication devices, in relation to the system (i.e., the location within the facility from which or to which the inmates are transmitting) the received signal strength indicator (RSSI) of the transmitted signals, etc. Additional relevant data includes the location from where the device was transmitting, the time and data stamps of the communications, geolocation information, the direction of the transmission, the type of antenna being used, the beamwidth of the signal, round trip time for transmissions to and from designated points, chip rates of the transmission, etc.

The secured facility may include within its border a number of telecommunication carrier devices (e.g., 106, 112, and 114) that may be powered on and even operational at one or more times during the expected stay of the contractor. Each of these UEs may be transmitting UE ID data 181 in various forms which can include the raw data, or other data types, identified above or extracted by the identification system. The contractor may receive additional information from third party sources that may assist in heightening or lowering the respective levels of confidence of various devices. The contractor may have received as noted above data from the secured facility, or from the Department of Corrections (DOC) that may include details such as an identification of authorized device's (e.g., the warden's and guard's mobile devices, etc.). Third party data may also be received regarding suspicious devices.

After the contractor's equipment is set up, the temporary network user equipment(s) 106, 112 and 114 may be identified via a base station 127 with a facility-directed antenna array 125 along with the server and gateway 178 and other network components. The MAS 100 may begin by collecting wireless transmission from the handsets to gather information. In some embodiments, the MAS 100 may be more sophisticated, and may employ a person or robot walking around the secured facility with a transceiver for capturing transmitted cellular or other wireless data.

The data passed along to the server may be further subdivided into voice call attempts versus SMS attempts along with the header data and content, and other information.

It will be appreciated that the temporary blocking duties performed by the MAS 100 are not necessary to the principles of the disclosure. In various embodiments, the contractor may access the network at the secured facility to use its equipment solely to collect transmitted raw data for subsequent use in identifying potential contraband, and for providing authorized versions of that data to the applicable carriers for blocking remote network access thereto.

It should be noted that FIG. 1 is not drawn to scale. Rather, its components are minimized to avoid unduly obscuring the concepts of the disclosure. For example, while base station 127 appears in FIG. 1 to be physically adjacent the network border 102 of the secured facility and hence the external base station 108 of the neighboring telecommunication carrier (e.g., AT&T, Verizon, etc.), it is nonetheless assumed for purposes of this example that the base station 127 has the power and direction of antenna 125 steered appropriately to cover the network within the secured facility, without appreciable (if any) bleeding to regions outside the network border 102 of the secured facility.

Figure 2:
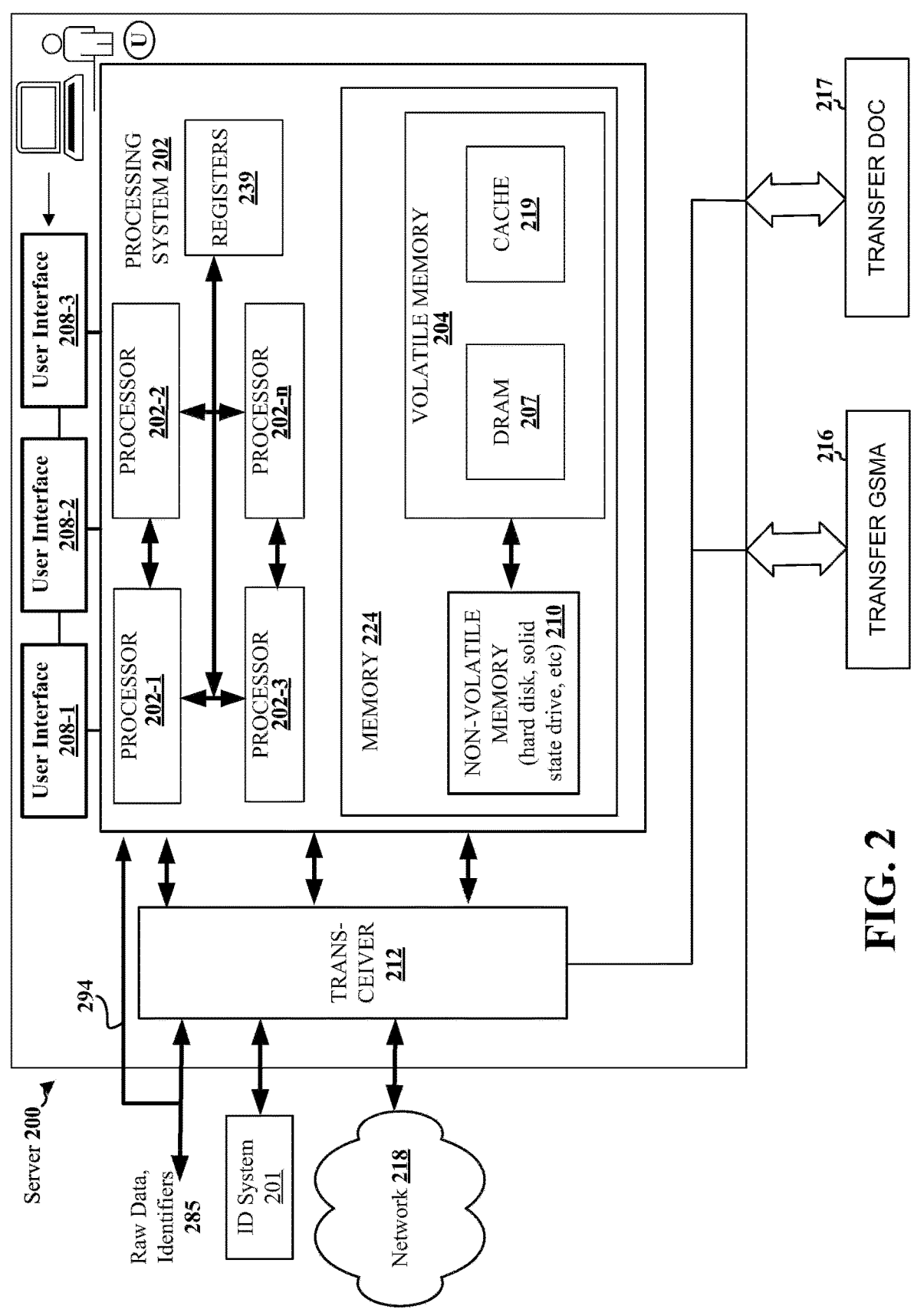
FIG. 2 is a block diagram of a server used for processing data retrieved from a secured facility.

FIG. 2 is a block diagram of a server 200 used for processing data retrieved from a secured facility. The server 200 may include a processing system 202. The processing system may include one or more processors 202-1-202.*n*. Examples of processors 202-1 may include those types of processors specified above, among others. Each of processors 202-1, 202-2, 202-3 through 202-*n* in the processing system 202 may execute code from registers 239. Registers 239 may be arranged in any logical way, with more than one rows or columns to accommodate multiple contemporaneous operations, etc.

In some embodiments, one or more, or all, of the registers 239 may be included in memory 224. Memory 224 may include computer-readable media such as non-volatile memory (NVM) 210. The NVM 210 may include flash memory, hard disks, solid state disk drives, and the like. Memory 224 may also include volatile memory 204, including dynamic RAM 207 used to store high speed applications when the server 200 is performing intense computation using multiple suites of software, for example. Volatile memory 204 may include cache memory 219, which may be one or more levels of the different processors' most recently used information, and which may be used by processors 202-1-202-*n* for fast access to the data.

In some embodiments, the memory 224 is deemed to be included with the processing system 202. However, these systems are identical to systems in which the processing system and memory are configured to be different components. For example, FIG. 2 broadly shows a system including a processing system and a memory (and other components). This is equivalent to a system that includes a processing system and a memory, regardless of whether the memory is illustrated to be part of the processing system.

Server 200 further includes a transceiver 212 coupled to the processing system 202 for transmitting and receiving data to network 218 which may, for example, be part of the Internet, and transmitting and receiving data to the identification system 201. In some embodiments, the server 200 belongs to the contractor, and the data collected during the contractor's visit to the facility is stored in the memory 224 (for example, in a database in NVM 210). In some embodiments, the data collected is transported over a secure channel on the network (e.g., streamed in or near real time, or streamed subsequently on demand, or sent via one or more files. The collected data may also be physical transported to the server 200, e.g., using one or more solid-state drives (SSDs), thumb drives, flash drives, or other structures. The data is input into the memory 224, whether directly via input 294 or through transceiver 212 via 285. Processing system 202 may include user interfaces (UIs) 208-1, 208-2, and 208-3, such that the data in the processing system 202 and memory 224 can be readily accessed and manipulated in any form of client-server relationship, e.g. by one or more corresponding users "U" or natively. Thus, the processing system 202 may, but need not, be implemented in a traditional server.

FIG. 2 also shows a transceiver interface "transfer GSMA" 216. This specialized interface, which may in some embodiments be part of transceiver 212. The Groupe Speciale Mobile Association (GSMA) is an association representing the interests of mobile operators and the mobile industry worldwide. Its members include mobile operators, handset and device manufacturers, software companies, mobile hardware providers and Internet companies. GSMA is standardized worldwide. Among numerous other responsibilities, the GSMA overlooks public policy and device security in connection with mobile networks. For example, the GSMA may maintain a database of phones that have certain categories such as lost, stolen, and in some cases contraband. The GSMA may also delegate these activities to other entities, such as by retaining or contracting third parties to maintain such databases. Carriers generally maintain a database of phone identifications that are lost, stolen, or otherwise unauthorized. In short, GSMA specifications indicate to the relevant carrier that a list of phones that were once subscribers of that carrier should no longer be used. Theft and loss of the device are similar to prison contraband in this respect. Accordingly, when GSMA or the designated entity receives authorized information validating that specific mobile devices are contraband, the GSMA or entity may provide this data to the applicable carrier. The carrier receives the information and thus blocks access by a corresponding telecommunication device to the network. For purposes of this disclosure, references to the GSMA may also include a designee, entity, or contractor that the GSMA may retain or otherwise engage to perform a particular task.

Part of the process of blocking cellular use on a carrier-level includes transferring data to the GSMA, which in various embodiments shown in GSMA 216 can be performed in an automated fashion using the I/O component GSMA 216. In other embodiments, a user may just send, mail or e-mail the necessary documents or files to the GSMA.

A similar I/O device or port, "Transfer DOC" 217 refers to embodiments involving an automated process of notifying the Department of Corrections that certain actions relating to blocking phones have been performed. In addition, one requirement to block such phones is for the contractor to acquire ownership of the contraband devices. Thus, the DOC may authorize the actions of the contractor, GSMA and carrier by transferring ownership or title of the tier-one contraband phones to the contractor, thereby authorizing the contractor to proceed with the GSMA. In other embodiments, these DOC documents and activities are performed manually or by mail or e-mail, as directed.

The processors shown in FIG. 2 may also reside in other equipment used on the premises of the secured facility. For example, whether or not housed in a server 200, one or more processors 202-1-202-*n* may be integrated in hardware within the MAS for controlling the flow of wireless transmissions and for instructing the network to block unauthorized transmissions. For the purposes of this disclosure, the term "controller" may be a microcontroller, a processor, or processing system, and the term "controller" may be synonymous with any of these elements for the purposes of this disclosure. Thus, in this disclosure, the controller may also be one or more processors, processing systems or microcontrollers distributed across the secured facility. In other embodiments, the controller may be at a central location. In short, the controller is broadly construed in this disclosure to include one hardware element or multiple hardware elements, any of which can include one or more processors or processing systems. Thus the present disclosure is not limited by the hardware configuration of the controller or processors, and FIG. 2 is used to represent an exemplary embodiment of a server 200 structure at a MAS for performing one or more of the functions described herein.

Figure 3:
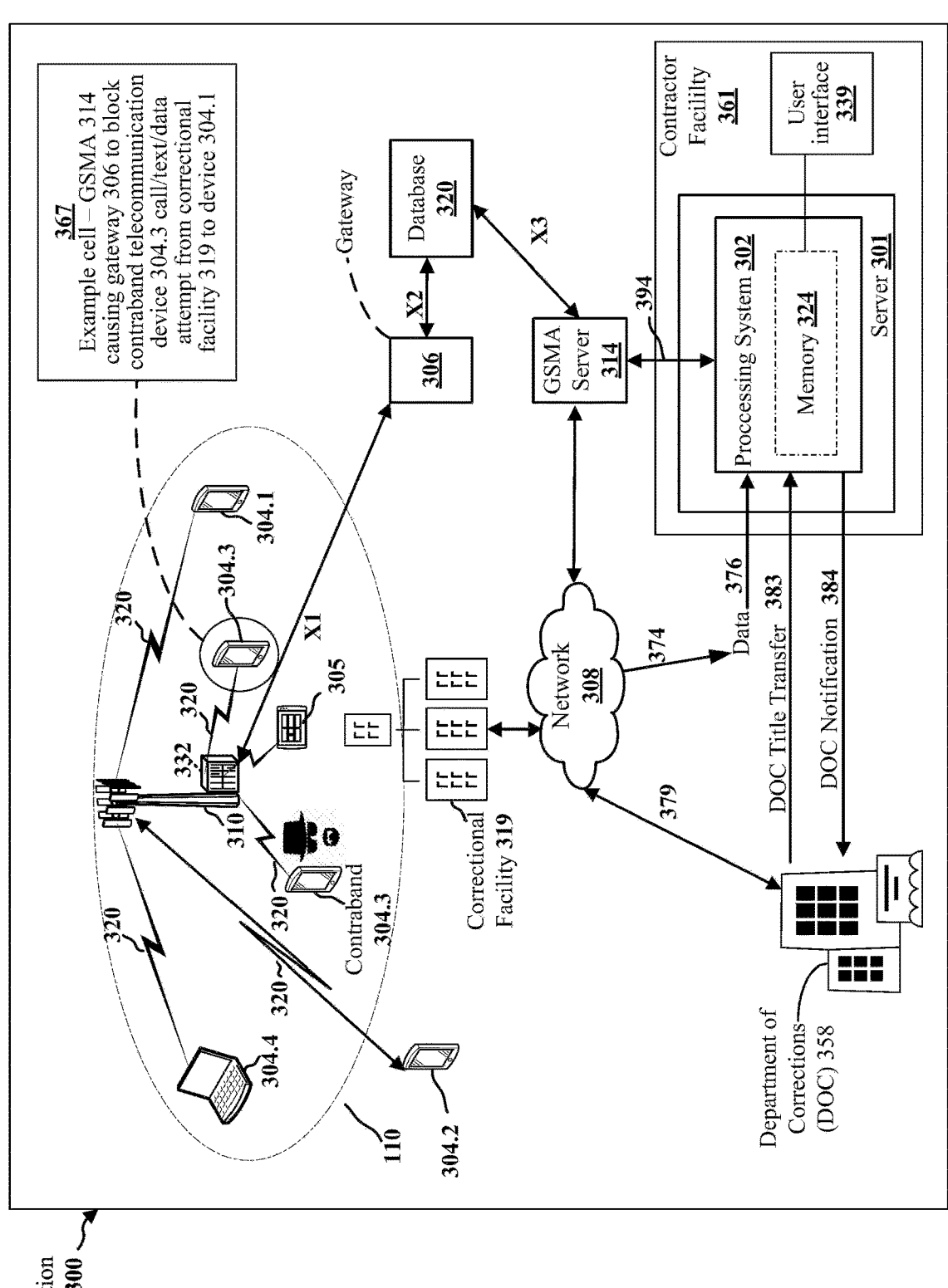
FIG. 3 is a conceptual diagram illustrating an example of a telecommunication network for carrier-based blocking of attempted calls or other transmissions to or from contraband devices at a correctional facility.

FIG. 3 is a conceptual diagram illustrating an example of a telecommunication carrier network 300 for carrier-based blocking of attempted calls or other transmissions to or from contraband devices (e.g., 304.3) at a correctional facility 319. The contractor may obtain, from the DOC 358, the correctional facility and other third parties, additional data points for correlating the various devices such as device identifiers from registered or authorized telecommunication devices.

As an initial matter, when people enter into the secured facility, they will place their cellular devices into a shielded box of an identification system 305, which will be described in more detail in FIG. 5. Generally speaking, the identification system 305 will obtain electronic identifiers from the cellular devices and may log the electronic identifiers into a log or database to tag these cellular devices as authorized cellular devices. This way only cellular devices that have been tagged as authorized or identified cellular devices may be able to connect to an telecommunications carrier network. Accordingly, cellular devices that have not been tagged or have already been identified as contraband devices may be blocked from connection to the telecommunication carrier network.

In some examples, a contractor may collect the raw data as described above or through a registration process for authorized phones using the identification system 305. Information from the DOC 358 may be sent to the data 376 input of server 301 directly. In other embodiments, the information from the DOC 358 may be sent to the correctional facility via a network over network link 379, and then sent over network 308 (which may be a cell or other portion of the carrier network, for example) to the correctional facility 319. The DOC information may also be provided manually to the contracting firm or by e-mail, and input into the processing system using data input 376. The gathered raw data can then be provided to the memory 324 associated with the processing system 302 included in server 301 at the contractor's facility 361. The gathered raw data may include information about telecommunication devices 304.1, 304.2, 304.3 and 304.45. These telecommunication devices may communicate with the contractor's established base station 332 and antenna tower 310 over one of plurality of links 320. While 304.3 may be a contraband device, it is assumed herein that at this early stage, device 304.3 has not yet been identified as such. The memory 342 in one embodiment may include a large repository that is portioned to store different memory types, such as one or more hard drives, although any type of non-volatile memory may be used.

After collecting relevant data via input 376 (which may be one or more of any type of input device, wired or wireless, such as a wired port or a wireless antenna coupled to a port, etc.), the identification system 305 may proceed to analyze the raw data using the processing system 302, the data collected in memory 324, and the one or more user interfaces that are linked to the processing system 302. As is also shown and discussed further below, the carrier's telecommunication network 300 includes an example cell 110, a portion of which overlaps the geographical region of correctional facility 319. While other cells from other carriers may be included in the region, and other cells specific to the network 300 cover other portions of the correctional facility 319, only the cell 110 is shown for simplicity. The carrier has a gateway/logical node 306 which is coupled via a backhaul network X1 to base station 332. The carrier also maintains a database 320. These components are described further below.

FIG. 3 describes an example of the MAS being implemented at a correctional facility for illustrative purposes only. It should be noted that the MAS system should not be limited to only being used at a correctional facility.

Figure 4:
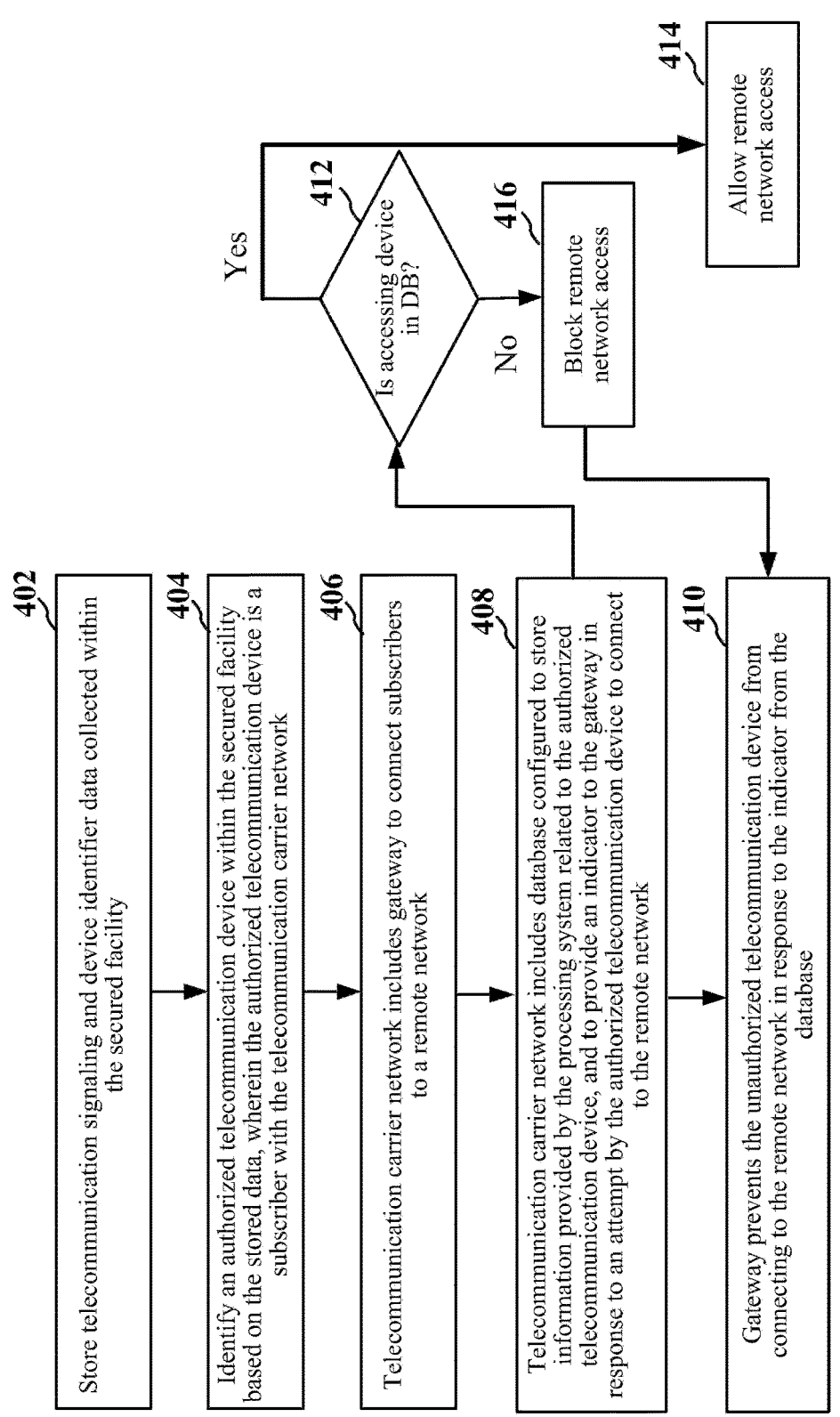
FIG. 4 is an exemplary flow diagram of a method for carrier-based management of communication from cellular devices according to an embodiment.

FIG. 4 is an exemplary flow diagram describing certain aspects of the disclosure. The steps of FIG. 4 may be performed by one or more of the server 301, processing system 202-1, 302, and carrier network 300 and other network components described throughout the disclosure.

Referring initially to 402, the processing system may use a dedicated network connection to collect device identifier data as well as data provided by the identification/registration system, the secured facility, and third parties. A processing system of a computing device may store the telecommunication signaling and device identifier data (e.g., signaling formats, IMSI, SMS data, voice call data, TCP/IP transmissions, and all alphanumerical or binary representations of any field representing the device data or the features, formats and structure of the signaling corresponding to the payload being transmitted, among other telecommunication signaling and device identifier information described in this disclosure) obtained from an identification system and/or registration system within a secured facility.

At 404, the processing system may identify an authorized telecommunication device within the secured facility based on the data obtained and stored by the identification system and/or registration system, wherein the authorized telecommunication device is a subscriber with the telecommunication carrier network, such as network 300 and its cell 110. The telecommunication carrier network includes a gateway or other cell-regulating component to connect subscribers to a remote network, as in 406.

The telecommunication carrier network includes a database configured to store information provided by the processing system, identification system, and/or registration system related to the authorized telecommunication device, and to provide an indicator to the gateway in response to an attempt by the authorized telecommunication device to connect to the remote network, as in 408.

At 410, the gateway of the carrier prevents the unauthorized telecommunication device (e.g., contraband devices) from connecting to the remote network in response to the indicator from the database. For example, at 412, the gateway may, via the base station or otherwise, determine whether a device attempting to access the network is an authorized device by comparing electronic identifiers stored in a database. If so, the gateway may proceed to allow access to the remote network, as in 414. If not, such that the gateway receives an indicator identifying the device as unidentified or contraband, the gateway may proceed to prevent the device from accessing a remote network, as in 416.

The identification system provides a simple and reliable way to identify and register cellular devices using their electronic identifiers. Since the electronic identifiers cannot be easily falsified or manipulated, a user of the apparatus can easily and quickly verify the identity of and/or create profiles for any cellular devices using the electronic identifiers by simply placing the cellular device in the RF containment space and operating a graphical user interface (GUI). Additionally, the apparatus is very simple to use because all an operator of the apparatus has to do is to place a cellular device inside of the RF containment space and press a button to operate the identification process. This makes the identification process virtually fool proof. This eliminates the need for a contractor to actively monitor and detect wireless devices, as compared to conventional solutions. This may result in a large cost savings to the secure facility. Also, the concerns of "bleeding" spurious, interfering transmissions outside the facility may largely eliminated because the contractor no longer has a need for a base station at the facility.

Furthermore, the identification system may be coupled to a cellular device logging, monitoring system, or MAS system such that when a cellular device is placed within the RF containment space, the logging or monitoring system can automatically extract electronic identifiers from the cellular device and log the electronic identifiers from the cellular device. This makes it so that the identity of a cellular device cannot be easily manipulated (e.g., switching SIM cards) or falsified by an operator when creating a profile for the cellular phone or a log entry for the cellular device.

Figure 5:
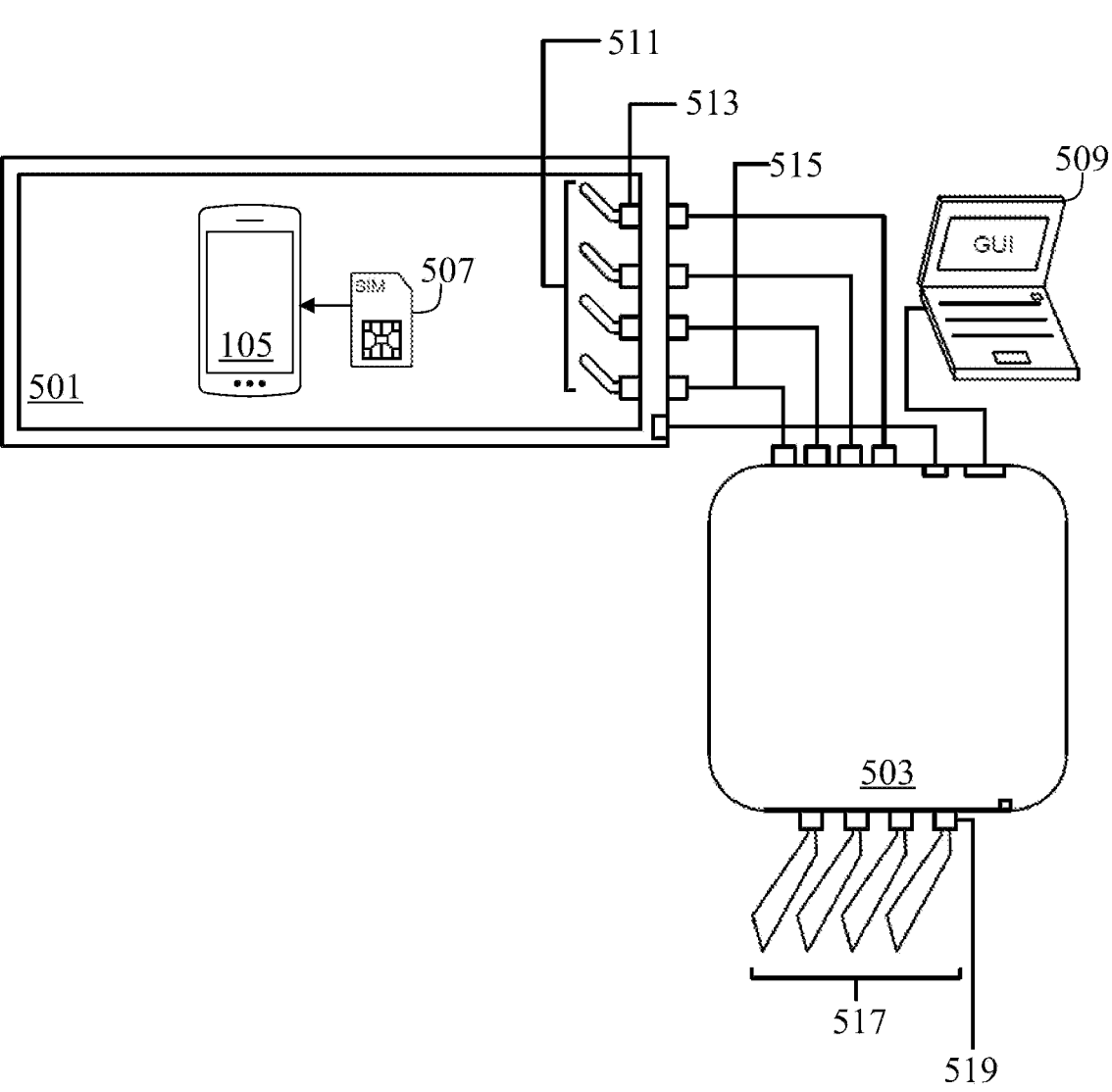
FIG. 5 is a diagram illustrating an example of an identification system that may be used at a secured facility for identifying cellular devices according to an embodiment.

FIG. 5 is a diagram illustrating an example of an identification system 101 that may be deployed to identify cellular devices. The purpose of the identification system 101 is to easily and reliably identify cellular devices using their electronic identifiers by creating a condition within an RF containment space (e.g., an enclosed and shielded box 601) that causes the cellular devices to connect to a base station 503 provided by the identification system 101 and then extract wireless identifiers from the cellular devices. In some cases, the base station may be a virtual base station. The extracted wireless identifiers may then be used to further extract an identification information of the cellular devices for identification, registration, logging, and/or management purposes.

In some examples, the identification system 101 may be strategically placed in the entrances and exits of a secured facility in order to identify and manage cellular devices that are used within the secured facility. In some examples, the identification system 101 may be mobile or portable (i.e., capable of being moved through different geographical positions). It should be noted that FIG. 5 is not drawn to scale. Rather, its components are minimized to avoid unduly obscuring the concepts of the disclosure.

As shown FIG. 5, the identification system 101 comprises at least a shielded box 501 (e.g., RF containment space) configured to create an RF containment space or block electromagnetic waves, one or more processors, and, optionally, a base transmission station (base station) 503 and/or display 509 from an external device or computing device.

The identification system 101 has a shielded box 501 that is configured to receive at least one cellular device 105 and uses one or more internal antennas 511 to emulate a base station of a telecommunication carrier (e.g., Verizon, T-Mobile, AT&T, or the like) by transmitting network parameters to the at least one cellular device 105, which causes a communication between the at least one cellular device 105 and the base station 503. Upon activation of the identification system 101, the at least one cellular device 105 will attempt to connect to a network set up by the base station 503 and, in turn, transmit an electronic identifier (e.g., IMSI, IMEI, or the like) to the identification system 101 when connecting with the network. The identification system 101 may further derive a make, model, or manufacturer of the cellular device 105 from the electronic identifiers. This ensures that the identity of the cellular device 105 is verified.

The shielded box 501 comprises one or more internal antennas 511, internal SMA connectors 513, and, optionally, a status indicator (not pictured). The shielded box 501 is configured to provide an electronically isolated environment by blocking electromagnetic waves or radio frequency (RF) waves. This means that when a cellular device 105 is placed inside the shielded box 501, the cellular device 105 is electronically isolated from the outside environment. The shielded box 501 should be isolated to determine with certainty that the electronic identifiers extracted from the cellular devices 105 belong to the cellular devices 105 that are placed inside the shielded box 501. If the shielded box 501 was not isolated from the outside environment, then the identification system 101 would not be able to say with certainty that the electronic identifiers belong to the cellular device 105 placed inside the shielded box. In addition, the shielded box 501 is isolated to stop other carrier signals from interfering with the cellular devices 105 inside the shielded box 501 and to ensure that the base station 503 is not communicating with other devices outside of the shielded box 501. In some examples, the shielded box 501 may be a Faraday cage. In some examples, the identification system 101 may also include a status indicator, which may be a LED, a stack light, or a display.

In some examples, the shielded box 501 may be electrically and physically tamperproof. Since the shielded box 501 may be deployed in a secured facility such as a secured facility, the identification system 101 should be ruggedized and tamperproof to prevent the identification system 101 from being sabotaged. For instance, the identification system 101 may contain tamperproof screws and/or have screwing mechanisms made out of titanium or stainless steel. In some examples, the interior of the identification system 101 may be constructed out of aluminum and the exterior box may be made out of a black polycarbonate.

Optionally, the identification system 101 may include a base station (e.g., transmitter-receiver) 503. The base station 503 comprises one or more scanning antennas 517 and one or more external SMA connector 519. In some examples, the base station 503 is connected to the one or more scanning antennas 517 via RF cables 515. The one or more scanning antennas 517 are configured to identify networks in an area of interest in order to determine transmission for inside the shielded box 501. In some examples, the identification system 101 comprises one or more processors configured to implement a virtual base station. In some examples, the base station 503 may be coupled via a backhaul connection to additional network equipment, including server and gateway.

In some examples, the identification system 101 may include a memory configured to store identifying data of identified wireless devices, one or more base stations and one or more antennas, a processing system to emulate a base station to transmit a signal to wireless devices and to carry out various computation functions of the system, and a housing that encompasses the device to prevent tampering or sabotage. The one or more base stations typically carries out the various transmission and reception functions of the identification system 101. The processing system carries out various computation functions of the identification system 101.

Data collection during deployment. The raw data collected by a MAS 100 from the transmitting cellular devices 105 may include metadata included with various message. Other relevant identifying data that may be transmitted from different wireless devices includes IMSI (International mobile subscriber identity), IMEI (International mobile equipment identity), GUTI (Globally unique temporary ID), SMS (Short message service), and other relevant data not limited to this list.

An IMSI is a unique number that is attached to a SIM card 507 and is used to identify the subscriber and services assigned to the subscriber. Accordingly, if a user transfer their SIM card 607 from one cellular device to another cellular device, the IMSI number from the previous cellular device will be carried over to the replacement cellular device that has been inserted with the SIM card.

An IMEI is a unique identifier for a cellular device that is the IMEI is attached to and is used to identify the cellular device 105. Since IMEI numbers are unique to a cellular device and cannot be easily changed, the IMEI numbers are useful in tracking and recovering lost or stolen phones. In addition, there is a global registry that contains all IMEI numbers such as Equipment Identification Register (EIR) that can be used to identify the cellular device and, therefore, identify an owner of the cellular device.

The equipment Identity Register (EIR) is a network database that stores lists of IMEI numbers. This database is used to manage valid IMEIs on the network so that stolen cellular devices or cellular devices of the wrong type would not be able to connect to the network. When a cellular devices is switched on, its unique IMEI number is transmitted to the network and checked against the EIR, which determines whether the cellular device can log onto the network to initiate and receive calls.

When a cellular device 105 attaches to a network, the cellular device 105 sends a signal to the network containing both IMSI and IMEI information. The IMSI is used for location update of the VLR/HLR registers, whereas the IMEA is used for checking of invalid equipment in the EIR repository. In addition, the cellular device 105 will register the IMEI on the network along with the IMSI (if a SIM card 507 is inserted). In some examples, the IMEI and IMSI is also being used by some applications and smartphone Operating systems for identification and is being tracked. For example, a mobile operator subscriber log may store the IMEI along with the IMSI and their subscriber information database. If a user uses a pre-paid anonymous SIM card (e.g., anonymous IMSI but with a known IMEI), the mobile operator may see that the cellular device belonged to a particular person if the person used that cellular device before with a different SIM (e.g., different IMSI but same known IMEI).

There may be several different methods of obtaining electronic identifiers from a cellular device 105 such as by causing the cellular device 105 to perform an attach process to a network provided by a base station 503 of the identification system 101. For example, the cellular device 105 must be placed inside the shielded box 601 in order to electronically isolate the cellular device 105 from an outside environment and cause the shielded box 501 to transmit, using one or more internal antennas 611, cellular network signals configured to emulate a base station of a telecommunication carrier to cause the cellular device 105 to attempt to connect to the network provided by the base station 503. It should be noted that there are several methods for a cellular device to attach to different RATs, but a few specific attach procedures will be explained below for illustrative purposes only.

When a cellular device 105 has been enticed to register with an identification system 101, the cellular device 105 may be interrogated for its IMSI. Many interrogation techniques can be derived directly from a reading of the cellular standard. In the case of Global System for Mobile communication (GSM), Universal Mobile Telecommunications Systems (UMTS), fourth generation long-term evolution (4G/LTE), fifth generation New Radio (NR), and 6G wireless device, the International Standard Mobile Identifier (IMSI), the Temporary Mobile Standard Identifier (TMSI), and the equipment electronic serial number (IMEI), the LTE Globally Unique Temporary ID GUTI, Subscription Concealed Identifier (SUCI) can be queried. For example, GUTI comprises of two main components, Globally Unique Mobility Management Entity Identifier (GUMMEI), which uniquely identifies a MME, and Mobile Temporary Mobile Subscriber Identity (M-TMSI), which identifies a user. As another example, SUCI is a unique identifier designed to protect the privacy of the subscriber's identity and is generated by the UE using an Elliptic Curve Integrated Encryption Scheme (ECIES)-based protection scheme.

Figure 6:
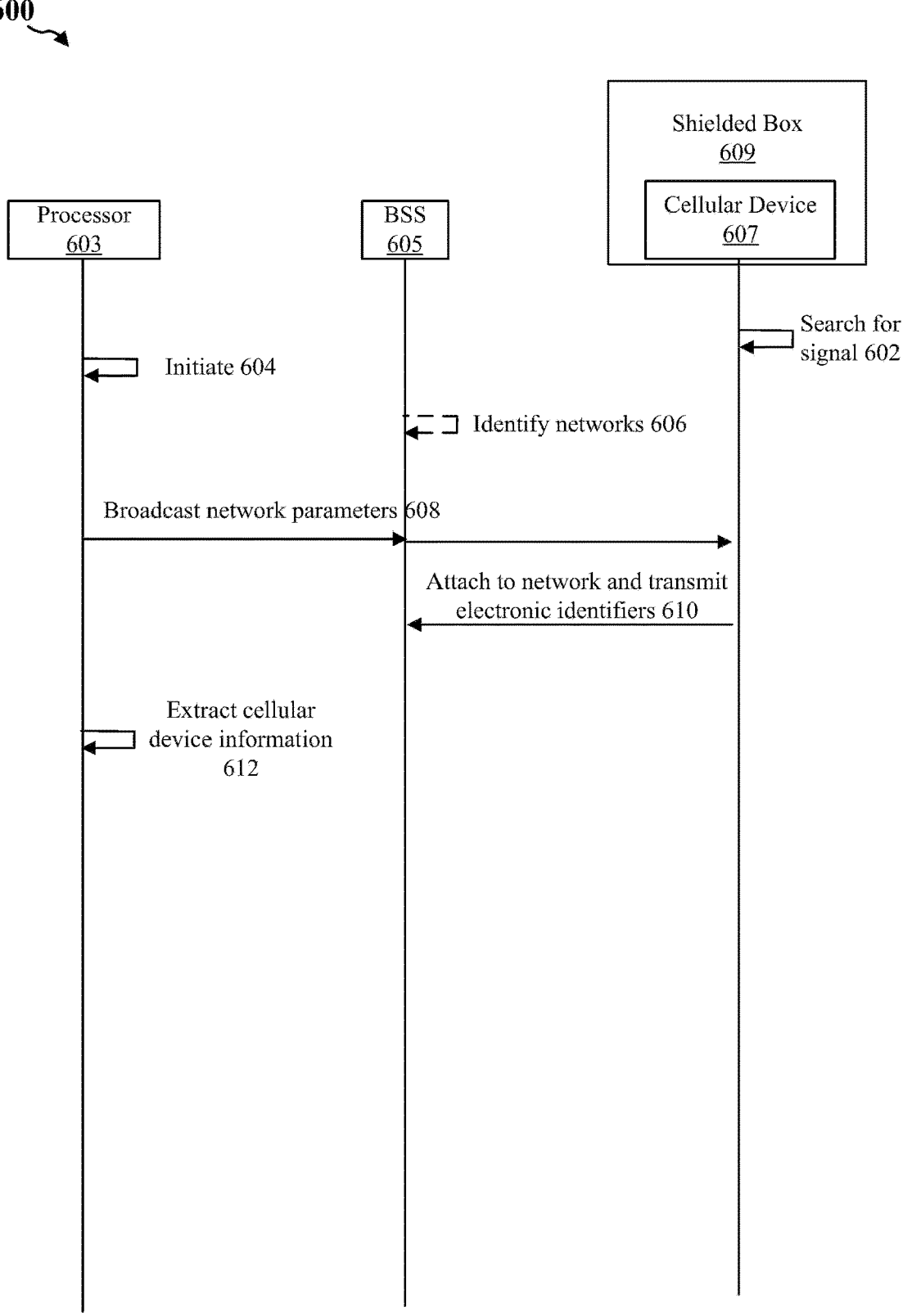
FIG. 6 is a call flow diagram of an example identification process between an identification system and a cellular device placed within a shielded box according to an embodiment.

FIG. 6 is a call flow diagram of an example identification process 600 between an identification system (e.g., the identification system 101) and a cellular device (e.g., cellular device 105) placed within a shielded box (e.g., containment space) according to an embodiment. Optional aspects are illustrated in dashed lines.

Specifically, FIG. 6 shows an identification process 600 for a cellular device 607 using a general Attach Procedure. The Attach Procedure may be different depending on which RAT network the cellular device is attempting to attach to. However, the overall goal of the Attach Procedure for each RAT is the same, which is to register a cellular device 607 to the network such that the cellular device 607 is able to register with the network to receive services. Accordingly, the identification system will invoke the Attach Procedure to obtain an electronic identifier, via an update location, from the cellular device 607.

At step 602, the cellular device 607 is placed in a shielded box 609 such that the cellular device 607 is electronically isolated from an outside environment and will search for a network to connect to.

At step 604, the processor 603 will initiate the identification process and emulate at least one base station of a telecommunication carrier to cause the cellular device 607 to attempt to connect to a network set up by the base station 605 when searching for a network.

Optionally, at step 606, the base station 605 will identify the networks in the area and decide the best transmissions to transmit inside the shielded box 609. The base station 605 may scan the networks periodically to determine whether there has been any changes in the RF footprint for commercial carriers. For example, the scanning process may be performed once a month.

At step 608, the processor 603 will cause internal antennas in the shielded box 609 to broadcast network parameters to cause the cellular device 607 to send a request to connect to a network setup by the base station 605. In some examples, the one or more cellular signal may be transmitted on one or more RAT to cause the cellular device 607 to attempt to connect to the network setup by the base station 605.

At step 610, the cellular device 607 will attach to the network and transmit its electronic identifiers as a result of attempting to connect to a network provided by the base station 605. As examples, a few different ways that the network may obtain electronic identifiers from the cellular device include through an IMSI attach, or location updating. Here, the electronic identifier will generally include at least a IMSI, which may be used as an electronic identifier of the cellular device 607. The IMSI is a number that uniquely identifiers every user of a cellular network. It is stored as a 64-bit field and is sent by the cellular device to the network.

At step 612, the processor 603 may extract additional cellular device information from the electronic identifier. As an example, the processor 603 may extract a make, model, or manufacture of the cellular device 607 using a Type Allocation Code (TAC) according to the IMEI of the cellular device.

As discussed above, there are several different methods for a network to obtain electronic identifiers from a cellular device.

To make it possible for a mobile subscriber to receive a call, the network must know where the cellular device is located. Accordingly, to keep the network updated on a location of the cellular device, the network system is informed by the cellular device on a regular basis. This process is called Location Updating. For example, the location update may occur in the following cases: (1) the cellular device detecting that it is in another location area (different location area code (LAC)) (e.g., when the cellular device is placed in a shielded box), or (2) the network requires the cellular device to perform location update at regular intervals.

Accordingly, the identification system may emulate a network provider and force the cellular device to transmit a location update process by placing the cellular device into a shielded box because once the cellular device is placed in the shielded box then the cellular device will be forced to perform a location update. There are three different types of location updates: normal, periodic registration, and IMSI attach/detach.

Normal Location Updating

In normal location updating, the location is initiated by the cellular device when it detects that it has entered a new location area (e.g., placed in the shielded box). The cellular device then listens to the system information, compares the Location Area Identity (LAI) to the one stored in the cellular device on the SIM card (on BCCH channel if idle or SACCH channel if active) and detects whether it has entered a new location area or is still in the same location area. If the broadcast LAI differs from the one stored on the SIM card, the cellular device must perform a normal location update procedure.

First, the cellular device sends a channel request message including the reason for the access. Next, the message received by the base stations is forwarded to the BSC. The BSC allocates an SDCCH, if there is one idle, and tells the BTS to activate it. The cellular device is now told to tune to the SDCHH. Here, the cellular device send a location updating request message that contains the identity of the cellular device, the identity of the old location are and the type of updating. At this point, the identification system will know the identity of the cellular device through the IMSI and/or IMEI.

Periodic Registration Location Updating

Periodic registration location may be used to reduce unnecessary paging of a cellular device that has left the coverage area (e.g., placed in a shielded box). First, the cellular device listens on the BCCH to specify if Periodic Registration Location Update is used in the cellular device. If periodic registration is used, the cellular device is told how often it must register. The frequency of periodical location update is controlled by the network, or according to the T3212 parameter. The T3212 is a decimal number within the range of 0 to 255 in the units of six minutes. For example, if the parameter is set to ten, then the cellular device must register every hour.

Both the cellular device and the MSC have the timer which controls the procedure. When the timer in the cellular device expires, the cellular device performs a location updating, type periodic registration. After that, the timers in the cellular device and MSC restart. The periodic registration timer is implemented in the cellular device, and will be reinitiated every time the cellular device returns to idle mode after being in dedicated mode.

IMSI Attach/Detach:

The IMSI attach/detach operation is an action taken by a cellular device to indicate to the network that it has entered into idle mode/inactive state. When a cellular device is powered on, an IMSI and/or IMEI attach message is sent to the MSC/VLR.

An example of an attach procedure is a GSM attach procedure. When a GSM cellular device is placed inside the box, the base station will emulate a network provider because the GSM cellular device will try to connect to whatever base station is broadcasting at the highest signal strength. Since the GSM cellular device is electronically isolated into the box, the only base station that will be broadcasting a network is the base station provided by the identification system 101. Once the GSM cellular device has identified the base station as having the best (e.g., in this case, the only) signal strength, the GSM cellular device begins negotiating a connection to the base station. The base station will first ask the GSM cellular device to send its encryption capabilities. After this step, the base station transmits an Identity Request to the GSM cellular device to collect the IMSI of the GSM cellular device. The GSM cellular devices responds with its IMSI because the IMSI is stored on the SIM card, which was issued by a mobile carrier, and the phone network needs to identify that the owner/user of the GSM cellular device is in fact a paying customer (e.g., subscriber) associated with the mobile carrier.

The identification system 101 may invoke a GPRS Attach procedure by which a Mobile Station (MS) registers (e.g., connects) to a GPRS network set up by a base station of the identification system. During the GPRS Attach procedure, when the MS makes an attach procedure for the first time, the MS will identify itself to the network using an IMSI. In other words, the GPRS Attach procedure enables the network (e.g., identification system 101 from FIG. 1) to know about the identify and existence of a cellular device 105.

When an MS powers on within network coverage, it starts by scanning all frequencies within its allocated band (e.g., 124 for standard GSM). It measures the received power on each of these frequencies and places them in order. The MS then selects and listens on the strongest RF level carrier for a frequency correction burst which is transmitted on the control channel of a BCCH carrier. This is to initially achieve frequency synchronization with the transmitting base station.

Having achieved frequency synchronization, the MS listens on the SCH for frame synchronization information. The SCH channel provides frame timing, the current frame number and BSIC information.

Once frame synchronization is achieved, the MS starts to read and decode the additional information being transmitted on the BCCH. This includes the adjacent cell list, minimum received signal strength, the LAI and beacon frequencies from surrounding cells. The MS then continues to monitor the PCH for incoming call paging requests, sends periodic location updates and maintains a record of surround cell signal strengths. If the MS fails to detect either the FCCH or the SCH, it will reselect the highest RF carrier level from its measured list and repeats the detection process.

The MS sends a message to the BSS on the random access channel (RACH) requesting a channel allocation. The BSS responds with a "Immediate Assignment" message on the access grant channel (AGCH). This message assigns a SDCC channel to the MS.

On assignment of the SDCCH, the MS sends an IMSI attach message over the SDCCH to the MSC/VLR relayed via the BSS. This informs the MSC/VLR of the MS's IMSI. This information may also be updated in the HLR which provides subscriber profile data to the VLR if it does not already have it.

Figure 7:
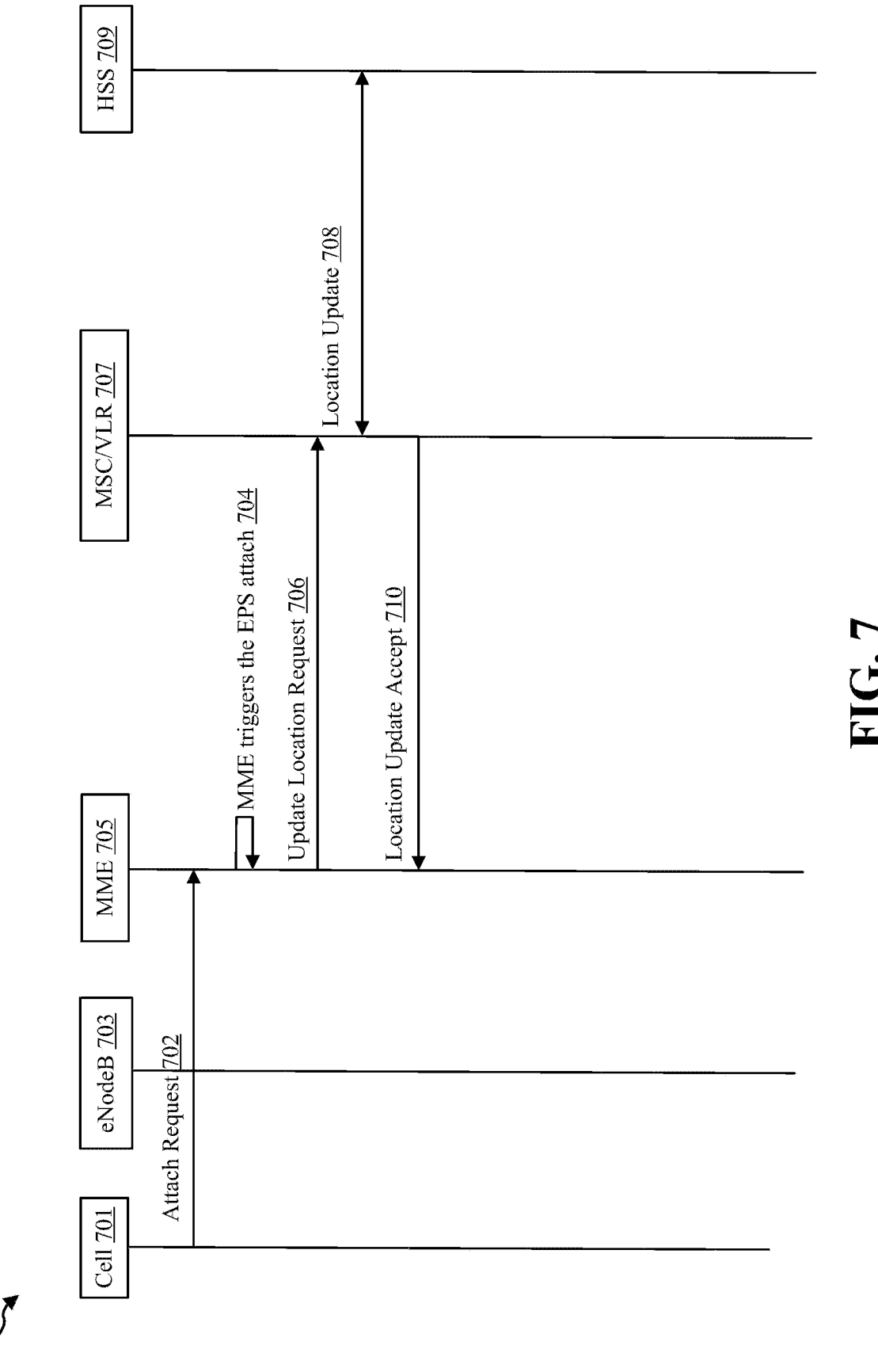
FIG. 7 is a call flow diagram of an example identification process between an identification system and a wireless device according to an embodiment.

FIG. 7 is a call flow diagram of an example identification process between an identification system and a wireless device according to an embodiment. Specifically, example 700 from FIG. 7 shows an identification process for a wireless device using an Attach Procedure. The goal of the Attach Procedure is to register a cellular device 701 to the network such that the cellular device 701 is able to register with the network to receive services. Accordingly, the identification system will invoke the Attach Procedure to obtain electronic identifiers, via an update location, from the cellular device 701.

At step 702, the cellular device 701 sends an "Attach Request" to the Mobile Management Entity (MME) 705. This includes the GUTI of the cellular device 701 received from the last attach, and the Access Point Name (APN) that the cellular device 701 would like to connect to. At this point, the identification system may have already obtained an electronic identifier since the Attach Request contains the IMSI information of the cellular device 701.

At step 704, the MME 705 triggers an EPS attach.

\At step 706, the MME 705 sends an update location request, which includes the MME ID of the MME 705, to the MSC/VLR 707.

At step 708, the HSS and the MSC/VLR 707 exchange location updates. This is done because the HSS 709 should always know which MME 705 is currently serving the cellular device 701. In addition, the HSS 709 provides MME 705 with cellular device subscription information, including the PDNs that the cellular device 701 is allowed to access.

At step 710, the MSC/VLR 707 sends an location update accept 710 to the MME 705.

FIG. 8 is a call flow diagram of an example identification process between an identification system and a wireless device according to an embodiment. Specifically, example 800 from FIG. 8 shows an identification process for a wireless device using a LAC update timer.

At step 812, the cellular device 801 transmits a RRC connection request to the eNodeB 803. At step 814, the eNodeB 803 responds with a RRC connection Setup. At step 816, the cellular device 801 transmit a RRC connection setup complete.

At step 818, the eNodeB 803 transmits a MM location update request to request the IMSI of the cellular device 801.

At step 820, the cellular device 801 responds with an MM identity response which includes the IMSI. The IMSI is an electronic identifier that can be used to identify the cellular device 801.

At step 822, the eNodeB 803 transmits a MM identity request to request the IMEI of the cellular device 801. At step 824, the cellular device 801 responds with a MM identity response that includes the IMEI. The IMSI is another electronic identifier that can be used to identify the cellular device 801.

At step 826, the eNodeB 803 transmits a MM identity request to request the international mobile station equipment identity software version (IMEISV) of the cellular device 801. At step 828, the cellular device 801 responds with a MM identity response that includes the IMEISV. The IMEISV is a code that identifies the mobile phone and the version of its software.

At step 830, the eNodeB 303 transmits a MM identity request to request the temporary identification number (TMSI) of the cellular device 801. At step 832, the cellular device 801 responds with a MM identity response that includes the TMSI. The TMSI is a temporary identification number that is used in a GSM network instead of the IMSI to ensure the privacy of the mobile subscriber.

When the cellular device 801 sends the MM location update request, it also starts an LAC timer. The eNodeB 803 ignores this request. If the cellular device 801 does not receive a valid response to the MM location update request within a predetermined time, then the cellular device 801 may resend the MM location update request. This process is repeated a few times and then the cellular device 801 aborts the connection.

Thus, by sending a series of three MMI identity request immediately after the RRC connection is established and before the cellular device 801 aborts the connection, the eNodeB 803 can receive the MM Identity Response messages from the cellular device 801 without requiring integrity protection.

Once the identity information has been collected, the eNodeB3 803 rejects the location update request thus preventing the cellular device 801 from repeatedly trying to camp on the eNodeB 803.

Although there may be many different ways to obtain electronic identifiers such as obtaining a location update from a cellular device. It should be noted that this disclosure is not limited to the specific procedures to obtain electronic identifiers. Instead, the disclosure describes the specific procedures for illustrative purposes only.

FIG. 9 is an example of a dashboard UI according to some embodiments. As shown in example 900, the dashboard UI may display a RAN set up table 901 and/or Device Capture/Registration Table 903 on either an external device or a display on the identification system. In some examples, the RAN set up table 901 lists all the different radio access networks and different telecommunication carriers emulated by the one or more network parameters transmitted by the base station or virtual base station. In some examples, the Device Capture/Registration Table 903 lists each cellular device placed inside the shielded box that undergoes the identification and check in process. In some examples, the list of device capture/registration may be a list of cellular devices authorized for use in the secured facility. In some examples, an operator of the identification system may click into an entry on the Device Capture/Registration Table 903 to navigate to a profile UI for the particular cellular device for an entry 905.

It should be noted that this disclosure is not limited to the specific configuration or any other specific table layout. Instead, the disclosure describes the specific columns and rows embodiment for illustrative purposes only. The RAN set up table 901 and the Device Capture/Registration Table 903 may contain any number of rows, columns, or any other configuration.

FIG. 10 is flowchart example of an example method of identifying cellular devices using an identification system according to an embodiment. Portions of the method 1000 may be performed by one or more processor (202) and/or at a base station (e.g., 103, 205) or a virtual base station of an identification system (e.g., 100, 200), a controller (gateway 306) on a network configured to manage outgoing or incoming wireless transmission, another wireless communications apparatus (e.g., the apparatus 1202), or one or more components thereof. In some examples, the network configured to manage wireless transmissions may be a rapid deployable network, a temporary network, or a fixed network. Optional aspects are illustrated in dashed lines. According to various different aspects, one or more of the illustrated methods 1000 may be omitted, transposed, and/or contemporaneously performed. This method 1000 allows for managing cellular device in a secured facility by managing outgoing or incoming wireless transmission based on an electronic identifier of a cellular phone.

At operation 1002, the method 1000 may include receiving a cellular device in an RF containment space (e.g., shielded box) configured to provide an electronically isolated environment by blocking electromagnetic waves or radio frequency (RF) waves such that the cellular device is electronically isolated from an exterior environment when the cellular device is placed inside the RF containment space. In some examples, the RF containment space comprises one or more internal antennas. As an example, referring back to FIG. 6, the RF containment space may be a shielded box 601 with one or more internal antennas 611.

Optionally, the method 1000 may identifying networks in an area of interest and decide the best transmissions to transmit inside the RF containment space, wherein the one or more cellular network signals are determined based on the identified networks. The base station 205 may scan the networks periodically to determine whether there has been any changes in the RF footprint for commercial carriers. For example, the scanning process may be performed once a month.

At operation 1004, the method 1000 may include transmitting, using the one or more internal antennas, one or more cellular network signals (e.g., network parameters) configured to emulate at least one base station of a telecommunication carrier to cause the cellular device to attempt to connect to a network set up by the base station when the cellular device is placed in an RF containment space. In some examples, the one or more cellular network signals are determined based on identifying networks in an area of interest.

Placing the cellular device into the RF containment space creates an environment where the cellular device is electronically isolated from electromagnetic waves or RF waves and will cause the cellular device to perform an attach procedure and/or a location update since the box.

In some examples, the one or more cellular signals are transmitted on one or more radio access technologies (RAT) to cause the cellular device to attempt to connect to a network set up by the base station. This means that the one or more cellular signals may transmit on all technologies to cover all RATs.

As an example, referring back to FIGS. 8A-8B, the cellular device will transmit electronic identifiers when attempting to connect to a network provided by the identification system.

The IMEI is a numeric identifier that is unique for 3GPP mobile phones and some satellite phones. GSM networks use the IMEI number to identify valid devices and stop a stolen phone from accessing the network. In particular, an IMEI number may be used as an input for tracking devices that are then able to locate a mobile phone within an accuracy of a few meters.

In some examples, such as in 2G/3G/4G/5G networks, the IMSI may be detected. IMSI comprises country code, wireless provider code, and phone number of the device. In some examples, an IMSI catcher may force the wireless device to respond with its specific location using GPS or the signal intensities of the wireless device's adjacent cell towers, allowing trilateration based on the known locations of the towers.

For example, a 5G registration request message is used by a cellular device to identify itself to the 5G network provided by a base station of the identification system when initiating registration. The registration request message includes the cellular device's IMSI or other unique identifier, such as Temporary Mobile Subscriber Identity (TMSI) or a 5G Globally Unique Temporary Identity (5G-GUTI).

At operation 1006, the method 1000 may include, in response to the cellular device attempting to gain access to the network, obtaining device information from the cellular device placed in the RF containment space via the one or more cellular network signals. In some examples, the device information may include at least one of IMSI or IMEI.

At operation 1008, the method 1000 may include, based on determining that the obtained device information matches stored identification information from an authorized devices database stored locally or on a cloud server, register the cellular device as an authorized device in a log. In some examples, the identification data comprises any one or more of an IMSI, an IMEI, a Globally unique temporary ID (GUTI), SMS data, Mobile station integrated services digital network (MSISDN) data, location data, or any information sufficient to uniquely identify the wireless device.

Optionally, at operation 1010, the method 1000 may include deploying a network configured to regulate wireless transmissions from or to the secured facility. In some examples, the network may include a multi-cellular network or a technology network. In some examples, the network may comprise the controller is configured to identify a location of a powered-on cellular device within the facility based on a transmission from the powered-on cellular device.

As an example, referring back to FIG. 3, a telecommunication network 300 may be deployed as a means to regulate wireless transmission by performing carrier-based blocking of attempted calls or other transmission to or from contraband devices at a secured facility 319. As an example, referring back to FIG. 5, the method 500 may manage access to a telecommunication carrier network based on identification of a cellular device.

At operation 1012, the method 1000 may include regulating wireless transmission to or from the secured facility.

As an example, referring back to FIG. 3, a gateway 306 may be configured to prevent unidentified, unauthorized, or contraband telecommunication devices from connecting to a remote network 300 in response to an indicator from a database 320. As another example, referring to FIG. 5, at step 518, the method 500 may include a gateway preventing the unauthorized telecommunication device from connecting to the remote network in response to the indicator from the database.

In some examples, the destination of the managed wireless transmission may be outside the facility within a remote network cell.

At operation 1014, the method 1000 may include, based on determining that the wireless transmission comprises identifying data corresponding to an authorized device in the log, instructing the network to manage the outgoing or incoming wireless transmission to its destination. In some examples, the wireless transmission includes an attempted or actual voice call, short message service (SMS) text, video call, data communication, or management messaging. As an example, referring back to FIG. 5, at step 516, the method 500 may include allowing remote network access to the telecommunication device.

Optionally, at operation 1016, the method 1000 may include, based on determining that the wireless transmission does not comprises identifying data that corresponds to an authorized device in the log, register the cellular device as an unauthorized device in the log and refrain from sending unauthorized wireless transmission.

In some examples, the method 1000 may include: based on determining that the wireless transmission does not comprises identifying data that corresponds to an authorized device in the log, register the cellular device as an unauthorized device in the log, instruct the network to manage the outgoing or incoming wireless transmission to its destination, and monitor data content of the wireless transmission from the unauthorized device or communications between a remote device and the unauthorized device.

In some examples, the method 1000 may include: tracking a duration since the cellular device has been registered in the log, and, based on determining that the cellular device has been registered in the log past a time threshold, unregister the cellular device as an authorized device and mark the cellular device as suspicious in the log.

Figure 11:
FIG. 11 is a diagram illustrating an example of a hardware implementation for an apparatus according to an embodiment.

FIG. 11 is a diagram 1100 illustrating an example of a hardware implementation for an apparatus 1102. The apparatus 1102 may include a base station and includes a baseband unit 1104. The baseband unit 1104 may communicate through a cellular RF transceiver with the cellular devices 105, 701, 801 which may include one or more VUEs and/or PUEs. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a radio scan component 1140, a network emulator component 1142, an identification component 1144, a registration component 1146, a GUI component 1148, a tracking component 1150, an alert component 1152, a regulation component 1154, and a transmission component 1134. The communications manager 1132 includes the one or more illustrated components. The components within the communications manager 1132 may be stored in the computer-readable medium/memory and/or configured as hardware within the baseband unit 1104. The baseband unit 1104 may be a component of the identification system 101 and may include the memory and/or at least one of the TX processor, the RX processor, and the controller/processor.

Optionally, the communications manager 1132 may include a radio scan component 1140 that is configured to identify wireless networks in a radio. The communications manager 1132 also includes a network emulator component 1142 that is configured to cause the box to transmit, using the one or more internal antennas, one or more cellular network signals configured to emulate at least one base station of a telecommunication carrier to cause the cellular device 105 to attempt to connect to a network set up by the base station of an apparatus 1102 when the cellular device 105 is placed in the RF containment space, e.g., as described in connection with operation 1004 of FIG. 10. The communications manager 1132 also includes an identification component 1144 that is configured to obtain, in response to the cellular device attempting to gain access to the network, an electronic identifier from the cellular device placed in the box via the one or more cellular network signals, e.g., as described in connection with operation 1006 of FIG. 10. The communications manager 1132 also includes a registration component 1146 that is configured to, based on determining that the obtained device information matches stored identification information from an authorized devices database stored locally or on a cloud server, register the cellular device as an authorized device in a log. The communications manager 1132 may also include a regulation component 1554 that is configured to regulate wireless transmission to or from a secured facility.

The apparatus may include additional components that perform each of the blocks of the algorithm in the aforementioned flowchart and timing diagram of FIGS. 5, 7, 8A-8B, and 10. As such, each block in the aforementioned flowchart and timing diagram of FIGS. 5, 7, 8A-8B, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The benefits of the subject matter claimed herein are immediately apparent. One of many advantages is that the identification system provides a simple and reliable way to verify, register, check in and check out an identity of cellular devices using their electronic identifiers. This eliminates the need for a contractor to actively monitor and detect wireless devices, as in conventional solutions. In addition, a sophisticated user is also not needed to operate the identification system. This alone can save the facility significant expenditures. No manpower is required (other than deploying the identification system and having an operator operate a simple UI) because an operator of the system simply has to place a cellular device inside of the shielded box and press a button to operate the identification process.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims. Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A system for managing communication of cellular devices in a secured facility, comprising:
   a box configured to provide an electronically isolated environment by blocking electromagnetic waves or radio frequency (RF) waves such that a cellular device placed in the box is electronically isolated from an exterior environment, wherein the box comprises one or more internal antennas;
   memory for storing a log;
   one or more processors configured to:
      cause the system to transmit, using the one or more internal antennas, one or more cellular network signals configured to emulate at least one base station of a telecommunication carrier to cause the cellular device to attempt to connect to a network set up by a base station when the cellular device is placed in the box,
      in response to the cellular device attempting to gain access to the network, obtain device information from the cellular device placed in the box via the one or more cellular network signal, and
      based on determining that the obtained device information matches stored identification information from an authorized devices database stored locally or on a cloud server, register the cellular device as an authorized device in the log; and
   a network configured to manage outgoing or incoming wireless transmission, wherein the network comprises a controller configured to:
      regulate wireless transmissions to or from the secured facility, and
      based on determining that the wireless transmission comprises identifying data corresponding to an authorized device in the log, instruct the network to manage the outgoing or incoming wireless transmission to its destination.

2. The system of claim 1, wherein the controller is further configured to:
   based on determining that the wireless transmission does not comprises identifying data that corresponds to an authorized device in the log, register the cellular device as an unauthorized device in the log and refrain from sending unauthorized wireless transmission.

3. The system of claim 1, wherein the controller is further configured to:
   based on determining that the wireless transmission does not comprises identifying data that corresponds to an authorized device in the log,
   register the cellular device as an unauthorized device in the log, and
   instruct the network to manage the outgoing or incoming wireless transmission to its destination, and monitor data content of the wireless transmission from the unauthorized device or communications between a remote device and the unauthorized device.

4. The system of claim 1, wherein the one or more processors are configured to:
   track a duration since the cellular device has been registered in the log, and
   based on determining that the cellular device has been registered in the log past a time threshold, unregister the cellular device as an authorized device and mark the cellular device as suspicious in the log.

5. The system of claim 1, wherein the wireless transmission includes an attempted or actual voice call, short message service (SMS) text, video call, data communication, or management messaging.

6. The system of claim 1, wherein the device information comprises at least one of an international mobile subscriber identity (IMSI) or an international mobile equipment identity (IMEI).

7. The system of claim 1, wherein the identification data comprises any one or more of an IMSI, an IMEI, a Globally unique temporary ID (GUTI), SMS data, Mobile station integrated services digital network (MSISDN) data, or location data.

8. The system of claim 1, wherein the destination of the managed wireless transmission is outside the facility within a remote network cell.

9. The system of claim 1, wherein the network comprises a multi-cellular network.

10. The system of claim 1, wherein the network comprising the controller is configured to identify a location of a powered-on cellular device within the facility based on a transmission from the powered-on cellular device.

11. The system of claim 1, wherein the one or more cellular signals are transmitted on two or more radio access technologies (RAT) to cause the cellular device to attempt to connect to a network set up by the base station.

12. An apparatus for managing communications of cellular devices in a secured facility, comprising:

a box configured to provide an electronically isolated environment by blocking electromagnetic waves or radio frequency (RF) waves such that a cellular device placed in the box is electronically isolated from an exterior environment, wherein the box comprises one or more internal antennas;

memory for storing a log;

one or more processors configured to:

cause the apparatus to transmit, using the one or more internal antennas, one or more cellular network signals configured to emulate at least one base station of a telecommunication carrier to cause the cellular device to attempt to connect to a network set up by a virtual base station when the cellular device is placed in the box, in response to the cellular device attempting to gain access to the network, obtain device information from the cellular device placed in the box via the one or more cellular network signal, and based on determining that the obtained device information matches stored identification information from an authorized devices database stored locally or on a cloud server, register the cellular device as an authorized device in the log; and a network configured to manage outgoing or incoming wireless transmission, wherein the network comprises a controller configured to:

regulate wireless transmissions to or from the secured facility, based on determining that the wireless transmission comprises identifying data corresponding to an authorized device in the log, instruct the network to manage the outgoing or incoming wireless transmission to its destination, and based on determining that the wireless transmission comprises identifying data that does not correspond to an authorized device in the log, refrain from sending unauthorized wireless transmission and store identifying data of the unauthorized device in the log.

13. The apparatus of claim 12, wherein the controller is further configured to:

based on determining that the wireless transmission does not comprises identifying data corresponding to an authorized device in the log, outputting an alert.

14. The apparatus of claim 12, wherein the one or more processors are configured to:

track a duration since the cellular device has been registered in the log, and based on determining that the cellular device has been registered in the log past a time threshold, unregister the cellular device as an authorized device and mark the cellular device as suspicious in the log.

15. The apparatus of claim 12, wherein the wireless transmission includes an attempted or actual voice call, short message service (SMS) text, video call, data communication, or management messaging.

16. The apparatus of claim 12, wherein the device information comprises at least one of an international mobile subscriber identity (IMSI) or an international mobile equipment identity (IMEI).

17. The apparatus of claim 12, wherein the identifying data comprises any one or more of an IMSI, an IMEI, a Globally unique temporary ID (GUTI), SMS data, Mobile station integrated services digital network (MSISDN) data, or location data.

18. The apparatus of claim 12, wherein the destination of the managed wireless transmission is outside the facility within a remote network cell.

19. The apparatus of claim 12, wherein the network comprises a multi-cellular network.

20. A method for managing communication of cellular devices in a secured facility, comprising:

receiving a cellular device in a box configured to provide an electronically isolated environment by blocking electromagnetic waves or radio frequency (RF) waves such that a cellular device placed in the box is electronically isolated from an exterior environment, wherein the box comprises one or more internal antennas;

transmitting, using the one or more internal antennas, one or more cellular network signals configured to emulate at least one base station of a telecommunication carrier to cause the cellular device to attempt to connect to a network set up by a base station when the cellular device is placed in the box, in response to the cellular device attempting to gain access to the network, obtaining device information from the cellular device placed in the box via the one or more cellular network signal, based on determining that the obtained device information matches stored identification information from an authorized devices database stored locally or on a cloud server, registering the cellular device as an authorized device in a log, deploying a network configured to regulate wireless transmissions from or to the secured facility, regulating wireless transmissions to or from the secured facility, based on determining that the wireless transmission comprises identifying data corresponding to an authorized device in the log, instructing the network to manage outgoing or incoming wireless transmission to its destination, and based on determining that the wireless transmission comprises identifying data that does not correspond to an authorized device in the log, refraining from sending unauthorized wireless transmission and store identifying data of the unauthorized device in the log.

\* \* \* \* \*